United States Patent
Anderson et al.

(10) Patent No.: US 8,559,544 B2
(45) Date of Patent: Oct. 15, 2013

(54) SYSTEMS AND METHODS FOR LATTICE REDUCTION

(75) Inventors: David Verl Anderson, Alpharetta, GA (US); Brian Joseph Gestner, Atlanta, GA (US); Wei Zhang, Santa Clara, CA (US); Xiaoli Ma, Norcross, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 305 days.

(21) Appl. No.: 12/943,824

(22) Filed: Nov. 10, 2010

(65) Prior Publication Data
US 2012/0159122 A1 Jun. 21, 2012

Related U.S. Application Data

(60) Provisional application No. 61/259,878, filed on Nov. 10, 2009.

(51) Int. Cl.
*H04B 7/02* (2006.01)
*G06F 15/80* (2006.01)

(52) U.S. Cl.
USPC .......................................... 375/267; 712/31

(58) Field of Classification Search
USPC ................... 375/267, 295; 712/31, E09.002
See application file for complete search history.

(56) References Cited

U.S. PATENT DOCUMENTS

| | | | |
|---|---|---|---|
| 6,675,187 B1 * | 1/2004 | Greenberger | 708/622 |
| 6,697,633 B1 * | 2/2004 | Dogan et al. | 455/509 |
| 2007/0097856 A1 * | 5/2007 | Wang et al. | 370/210 |
| 2007/0115909 A1 * | 5/2007 | Wang et al. | 370/342 |
| 2008/0240277 A1 * | 10/2008 | Anholt et al. | 375/262 |
| 2009/0003476 A1 * | 1/2009 | Rog et al. | 375/260 |
| 2009/0116588 A1 * | 5/2009 | McNamara et al. | 375/340 |
| 2009/0190683 A1 * | 7/2009 | Awater et al. | 375/262 |
| 2009/0196379 A1 * | 8/2009 | Gan et al. | 375/340 |

* cited by examiner

*Primary Examiner* — Shuwang Liu
*Assistant Examiner* — David Huang
(74) *Attorney, Agent, or Firm* — Dustin B. Weeks, Esq.; Ryan A. Schneider, Esq.; Troutman Sanders LLP

(57) ABSTRACT

Disclosed herein are lattice reduction systems and methods for a MIMO communication system. One such method includes providing a channel matrix corresponding to a channel in a MIMO communication system, preprocessing the channel matrix to form at least an upper triangular matrix, implementing a relaxed size reduction process, and implementing a basis update process. Implementing the relaxed size reduction process comprises choosing a first relaxed size reduction parameter for a first-off-diagonal element of the upper triangular matrix, choosing a second relaxed size reduction parameter, which is greater than the first relaxed size reduction parameter, for a second-off-diagonal element of the upper triangular matrix evaluating whether a first relaxed size reduction condition is satisfied for the first-off-diagonal element of the upper triangular matrix, and evaluating whether a second relaxed size reduction condition is satisfied for the second-off-diagonal element of the upper triangular matrix.

23 Claims, 5 Drawing Sheets

SYSTEMS AND METHODS FOR LATTICE REDUCTION

CROSS-REFERENCE TO RELATED APPLICATIONS

This application claims the benefit of U.S. Provisional Patent Application No. 61/259,878, filed on 10 Nov. 2009, entitled "Modified Complex Lenstra, Lenstra, Lovasz Based Lattice Reduction Hardware Architecture for MIMO Detection", which is hereby incorporated by reference as if fully set forth below.

FEDERALLY SPONSORED RESEARCH STATEMENT

The invention described in this patent application were made with Government support under Contract No. DAAD19-01-2-0011, awarded by the U.S. Army Research Lab. The Government has certain rights in the invention described in this patent application.

FIELD OF THE INVENTION

Embodiments of the present invention relate generally to signal processing systems and methods and, more particularly, to systems, devices, and methods for multiple-input multiple-output signal transmission detection.

BACKGROUND OF THE INVENTION

Multiple-Input Multiple-Output ("MIMO") communication systems are becoming increasingly popular as a solution to increasing demands for higher data-rates and more reliable wireless communication systems. These systems comprise multiple antennas at a transmitter side of the communication system and multiple antennas at the receiver side of the communication system. Each transmitter antenna can transmit a different signal at a common frequency through a different channel of the communication system. Each receiver antenna may receive each signal from the multiple transmitter-antennas. During transit, the transmitted signals may encounter different obstacles such that the frequency response of each channel is different. Thus, a common goal of conventional systems is to attempt to efficiently detect the transmitted symbols by determining the frequency response of each channel in the communication system.

Although the optimal solution to the MIMO symbol detection problem, Maximum Likelihood ("ML") detection, is known, a brute-force ML detector implementation involves an exhaustive search over all possible transmitted symbol vectors. This approach is infeasible for hardware implementations when either a large signal constellation or a large number of transmit and receive antennas are employed. Hence, a goal of conventional systems is to design hardware for MIMO symbol detection that achieves comparable Bit-Error-Rate ("BER") performance to the ML detector while having low hardware complexity and meeting throughput and latency requirements.

Some conventional MIMO symbol detection systems employ methods of linear detection and Successive Interference Cancelation ("SIC"). Because most of the required processing for these detectors need only occur at the maximum packet-rate (preprocessing) and the required symbol-rate processing has relatively low-complexity, the throughput requirements for certain wireless standards, such as 802.11n, can be achieved in these systems. These methods, however, do not collect the same diversity (negative logarithmic asymptotic slope of the BER versus Signal-to-Noise-Ratio ("SNR") curve) as ML detection. As a result, these methods exhibit greatly reduced system performance compared to ML detectors.

Other conventional symbol detection systems employ Sphere Decoding ("SD") algorithms. Hardware implementations of SD algorithms can achieve ML or near-ML performance. Unfortunately, these methods exhibit greatly increased symbol-rate processing complexity compared to linear or SIC detectors. The complexity of SD methods can also vary widely with changing channel conditions.

The maximum packet-rate of 802.11n is considerably less than the symbol-rate. Therefore, it is desirable to obtain detection systems and methods that achieve ML or near-ML performance at the cost of increased preprocessing complexity as oppose to increased symbol-rate processing complexity. Systems having these desired characteristics include Lattice Reduction ("LR") aided detectors, which, unlike SD methods, incorporate LR algorithms into the preprocessing part of linear or SIC detectors and only increase the symbol-rate processing complexity slightly. Specifically, LR systems and methods only require lattice reduction once per received packet (per subcarrier). LR-aided detectors also exhibit the desirable property of having a complexity that is independent of both the channel SNR and signal constellation (assuming individual arithmetic operations have O(1) complexity).

A variety of hardware realizations of LR-aided detectors have been explored to exploit these properties and to achieve near-ML performance. Various explorations have included a Very-Large-Scale Integration ("VLSI") implementation of a simplified Brun's LR algorithm and a software implementation of Seysen's LR algorithm on a reconfigurable baseband processor. Frequently explored variants, however, employ the Complex Lenstra-Lenstra-Lovasz ("CLLL") LR algorithm.

The CLLL algorithm has the desirable properties of requiring sorted QR-decomposition preprocessing instead of Direct Matrix Inversion ("DMI") preprocessing. Further, the CLLL algorithm has superior performance to the conventional MIMO detection systems and does not suffer from the scalability issues in some of the conventional systems. The CLLL algorithm can also be used to significantly reduce the complexity of SD algorithms. The conventional CLLL algorithm, however, is unable to be feasibly implemented in fixed-point hardware architecture.

BRIEF SUMMARY OF THE INVENTION

The present invention describes lattice reduction systems and methods for a multiple-input multiple-output communication system. An exemplary embodiment of the present invention provides a lattice reduction method including providing a channel matrix corresponding to a channel in a multiple-input multiple-output communication system, preprocessing the channel matrix to form at least an upper triangular matrix, implementing a size reduction process on elements of the upper triangular matrix, and implementing a basis update process on diagonal elements of the upper triangular matrix.

In an exemplary embodiment of the present invention, the size reduction process is a relaxed size reduction process, which includes choosing a first relaxed size reduction parameter for a first-off-diagonal element of the upper triangular matrix, choosing a second relaxed size reduction parameter, which is greater than the first relaxed size reduction parameter, for a second-off-diagonal element of the upper triangular matrix, evaluating whether a first relaxed size reduction condition is satisfied for the first-off-diagonal element of the upper triangular matrix, and evaluating whether a second relaxed size reduction condition is satisfied for the second-off-diagonal element of the upper triangular matrix.

In another exemplary embodiment of the present invention, the basis update process is a rapid basis update process, which includes choosing an efficient Siegel condition factor so that a first Siegel condition can be evaluated between a first pair of adjacent diagonal elements of the upper triangular matrix without using multiplication operations and evaluating whether the first Siegel condition is satisfied between the first pair of adjacent diagonal elements of the upper triangular matrix without using multiplication operations. The first pair of adjacent diagonal elements can include a first diagonal element and a second diagonal element.

In yet another exemplary embodiment of the present invention, the basis update process is an iterative basis update process and includes computing a 2×2 unitary matrix using a number of vectoring iterations. In some embodiments, the step of computing the 2×2 unitary matrix is completed in a number of cycles equal to a number of pipeline stages plus the number of vectoring iterations minus one.

In addition to lattice reduction methods, the present invention provides lattice reduction systems. An exemplary embodiment of a lattice reduction system includes a master processor configured to transmit a complex-integer output to a first FIFO queue and a 2×2 unitary matrix output to a second FIFO queue, a first slave processor in indirect communication with the master processor by way of at least the first FIFO queue and configured to receive the complex-integer output from the first FIFO queue and process a unimodular matrix, and a second slave processor in indirect communication with the master processor by way of at least the second FIFO queue and configured to receive the 2×2 unitary matrix output from the second FIFO queue and process a second unitary matrix. In some embodiments of the lattice reduction system, the master processor, the first slave processor, and the second slave processor utilize a single multiplier pipeline structure.

These and other aspects of the present subject matter are described in the Detailed Description below and the accompanying figures. Other aspects and features of embodiments of the present invention will become apparent to those of ordinary skill in the art, upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments it is to be understood that such exemplary embodiments can be implemented in various devices, systems, and methods of the present invention.

BRIEF DESCRIPTION OF THE FIGURES

The following Detailed Description of preferred embodiments is better understood when read in conjunction with the appended drawings. For the purposes of illustration, there is shown in the drawings exemplary embodiments. But, the subject matter is not limited to the specific elements and instrumentalities disclosed. In the drawings.

DETAILED DESCRIPTION OF PREFERRED EMBODIMENTS

To facilitate an understanding of the principles and features of the invention, various illustrative embodiments are explained below. In particular, the invention is described in the context of being systems and methods for lattice reduction for MIMO communication systems. Embodiments of the present invention may be applied to any wireless MIMO communication system standard including but not limited to IEEE 802.11n (Wifi), 4G, 3GPP, Long term Evolution, WiMAX, and HSPA+. Embodiments of the invention, however, are not limited to use in wireless MIMO communication systems. Rather, embodiments of the invention can be used for processing other MIMO communication systems, including, but not limited to, optical MIMO systems or other transmission systems having an architecture incorporating multiple transmitters.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

The following paragraph describes the notation used herein. Superscript $^H$ denotes Hermitian, * conjugate, and $^T$ transpose. The real and imaginary parts are denoted as $\Re[\bullet]$ and $\Im[\bullet]$ respectively. |a| is reserved for the absolute value of scalar a or cardinality of a if a is a set, $\|a\|$ for the 2-norm of vector a, and $E[\bullet]$ for expectation. $I_N$ denotes the N×N identity matrix. Unless explicitly stated otherwise, the n-th element of a vector x is denoted by $x_n$, and the (m,n)-th element of a matrix X is denoted by $X_{m,n}$.

Figure 1:
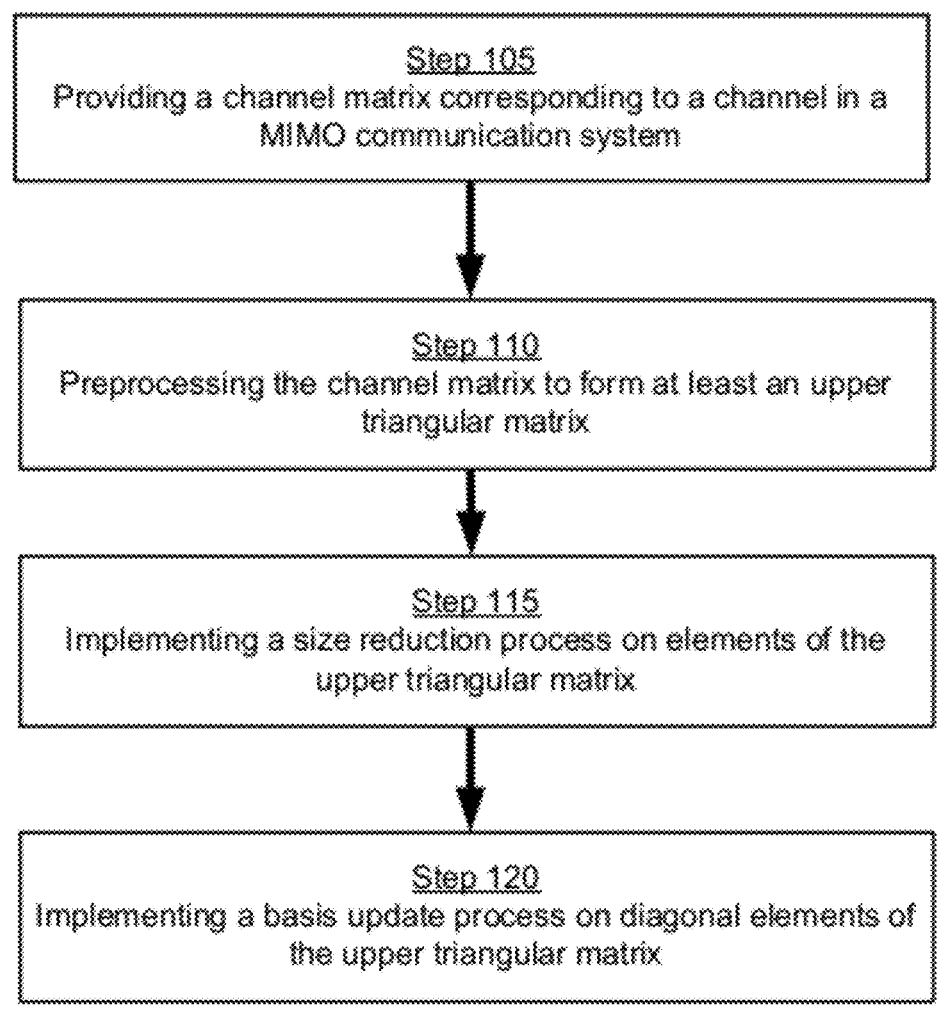
FIG. 1 provides a block diagram of an exemplary lattice reduction method.

The present invention describes lattice reduction systems and methods for a MIMO communication system. FIG. 1 provides a block diagram of an exemplary LR method 100. An exemplary embodiment of the present invention provides a LR method 100 including providing a channel matrix corresponding to a channel in a MIMO communication system 105, preprocessing the channel matrix to form at least an upper triangular matrix 110, implementing a size reduction process on elements of the upper triangular matrix 115, and implementing a basis update process on diagonal elements of the upper triangular matrix 120.

The LR method 100 can be considered a general description of some methods of the present invention. In various embodiments, the LR method 100 can be modified according to the desires of particular embodiments of the present invention. For example, implementing a size reduction process 115 can be implementing a relaxed size reduction process, implementing a basis update process 120 can be implementing a rapid basis update process, or both.

In an exemplary embodiment of the LR method 100, the implementing a size reduction process 110 can be implementing a relaxed size reduction process, which includes choosing a first relaxed size reduction parameter for a first-off-diagonal element of the upper triangular matrix, choosing a second relaxed size reduction parameter, which is greater than the first relaxed size reduction parameter, for a second-off-diagonal element of the upper triangular matrix, evaluating whether a first relaxed size reduction condition is satisfied for the first-off-diagonal element of the upper triangular matrix, and evaluating whether a second relaxed size reduction condition is satisfied for the second-off-diagonal element of the upper triangular matrix.

In another exemplary embodiment of the LR method, the implementing a basis update process 120 can be implementing a rapid basis update process, which includes choosing an efficient Siegel condition factor so that a first Siegel condition can be evaluated between a first pair of adjacent diagonal elements of the upper triangular matrix without using multiplication operations and evaluating whether the first Siegel condition is satisfied between the first pair of adjacent diagonal elements of the upper triangular matrix without using multiplication operations. The first pair of adjacent diagonal elements can include a first diagonal element and a second diagonal element.

In yet another exemplary embodiment of the LR method, the implementing a basis update process 120 can be implementing an iterative basis update process and includes computing a 2×2 unitary matrix using a number of vectoring iterations. In some embodiments, the step of computing the 2×2 unitary matrix is completed in a number of cycles equal to a number of pipeline stages plus the number of vectoring iterations minus one.

In addition to LR methods, the present invention provides LR systems. An exemplary embodiment of a LR system includes a master processor configured to transmit a complex-integer output to a first FIFO queue and a 2×2 unitary matrix output to a second FIFO queue, a first slave processor in indirect communication with the master processor by way of at least the first FIFO queue and configured to receive the complex-integer output from the first FIFO queue and process a unimodular matrix, and a second slave processor in indirect communication with the master processor by way of at least the second FIFO queue and configured to receive the 2×2 unitary matrix output from the second FIFO queue and process a second unitary matrix. In some embodiments of a LR system, the master processor, the first slave processor, and the second slave processor utilize a single multiplier pipeline structure.

Some embodiments of the present invention comprise a flat-fading MIMO communication system with $N_t$ transmit-antennas and $N_r$ receive-antennas. The data stream in these embodiments can be divided into $N_t$ sub-streams and transmitted through $N_t$ antennas. In some embodiments, $s=[s_1, s_2, \ldots, s_{N_t}]^T \in S^{N_t}$ can represent the $N_t \times 1$ transmitted data vector at one time slot where S can be the constellation set of each element in s. In some embodiments, H can be the $N_r \times N_t$ channel matrix corresponding to a channel in a MIMO communication system. In some embodiments, $y=[y_1, y_2, \ldots, y_N]^T$ can denote the received signal at one time slot from N, receive-antennas. In an exemplary embodiment of the present invention, the input-output relationship for a MIMO communication system can be, $$y = Hs + \eta w \quad \quad \text{Equation 1:}$$

where $$\eta = \sqrt{\frac{E[S^H S]}{N_t}}$$

and $w=[w_1, w_2, \ldots, w_{N_r}]^T$ can be the white Gaussian noise vector observed at the $N_r$ receive-antennas with zero mean and covariance matrix $E[ww^H]=\sigma_w^2 I_{N_r}$. In some embodiments, the elements of H can be independent identically distributed (i.i.d.) complex Gaussian distributed coefficients with zero mean and unit variance. Additionally, in some embodiments, a noise variance $\sigma_w^2$ is known at the receiver, and H is known at the receiver but unknown at the transmitter. Given this model system, symbol detection can be the process of determining an estimates ŝ of the symbol vector s that was sent based on knowledge of H, y, and $\sigma_w^2$.

In an exemplary embodiment of the present invention, a Minimum Mean Square Error ("MMSE")-SIC detection method can be derived by starting with the MMSE equalizer equation. Based on the model in Equation 1, the MMSE equalizer equation can be, $$x^{(MMSE)} = (H^H H + \sigma_w^2 I_{N_t})^{-1} H^H y \quad \quad \text{Equation 2:}$$

In an exemplary embodiment, a subsequent symbol detection step can comprise application of a quantization function $Q_S$, which can quantize each element to the closest symbol in S. This can yield a detection result of $\hat{s}^{(MMSE)}=Q_s[X^{(MMSE)}]$. In another exemplary embodiment, $x^{(MMSE)}$ can also be found by first defining, $$\overline{H} = \begin{bmatrix} H \\ \sigma_w I_{N_t} \end{bmatrix} \quad \quad \text{Equation 3}$$

$$\overline{y} = \begin{bmatrix} y \\ 0_{N_t \times 1} \end{bmatrix}$$

and then computing the least-squares solution to the (over-constrained) extended system $\overline{H}x^{(MMSE)}=\overline{y}$, which can yield, $$x^{(MMSE)} = (\overline{H}^H \overline{H})^{-1} \overline{H}^H \overline{y} \quad \quad \text{Equation 4:}$$

In some embodiments of the present invention, the MMSE-SIC solution $\hat{s}^{(MMSE\text{-}SIC)}$ can be determined by first finding the QR-decomposition, $\overline{H}=\overline{QR}$, where $\overline{Q}$ can be a $(N_r+N_t)\times N_t$ matrix and $\overline{R}$ can be a $N_t \times N_t$ upper triangular matrix. This factorization can then be substituted into Equation 4 to obtain (assuming $\overline{R}$ is invertible), $$\overline{R}x^{(MMSE)} = \overline{Q}^H \overline{y} \quad \quad \text{Equation 5:}$$

In some embodiments, $\overline{b}=\overline{Q}^H\overline{y}$ and, $$\hat{s}_n^{(MMSE-SIC)} = Q_S \left[ \frac{\overline{b}_n - \sum_{j=n+1}^{N_t} -R_{n,j}\hat{s}_j^{(MMSE-SIC)}}{\overline{R}_{n,n}} \right] \quad \text{Equation 6}$$

can be used to complete the MMSE-SIC detection method. Unfortunately, the diversity order collected under some of these embodiments is $N_r-N_t+1$.

To restore full receive diversity order N, to linear and SIC detectors, some embodiments of the present invention employ LR techniques in the detection process. Some embodiments of the LR methods comprise preprocessing H to produce a reduced lattice basis $\bar{H}=HT$, where T is a unimodular matrix. This factorization allows Equation 1 to be rewritten as, $$y=HT(T^{-1}s)+\eta w=\bar{H}z+\eta w \qquad \text{Equation 7:}$$

Some embodiments of the LR systems and methods can comprise finding an estimate $\hat{z}$ of the transmitted symbol vector in the z-domain using linear detection or SIC. In some of these embodiments, $\hat{s}$ can be determined by transforming each element of $\hat{z}$ back to the original signal constellation using $\hat{s}=Q_S[T\hat{z}]$.

In some embodiments, the complex-valued QR-decomposition formulation of the LLL algorithm, the CLLL algorithm, can operate on the QR-decomposition of $\bar{H}$. The $\bar{H}=\tilde{Q}\tilde{R}$ factorization returned by the CLLL algorithm can satisfy the size reduction condition in Equation 8 and the complex Lovász condition in Equation 9, $$\Re[\tilde{R}_{n,k}],|\Im[\tilde{R}_{n,k}]|\leq\tfrac{1}{2}|\tilde{R}_{n,n}|,\forall 1\leq n<k\leq N_t \qquad \text{Equation 8:}$$

$$\delta|\tilde{R}_{k-1,k-1}|^2\leq|\tilde{R}_{k,k}|^2+R_{k-1,k}|^2,\forall k \in [2,N_t] \qquad \text{Equation 9:}$$

where the parameter $\delta$ is a relaxation parameter that can be arbitrarily chosen from $(0.5, 1]$. To reduce the complexity of the CLLL algorithm, in some embodiments of the present invention, the complex Lovasz condition is replaced with the Siegel condition, $$|R\tilde{R}_{k-1,k-1}|^2\leq\zeta|\tilde{R}_{k,k}|^2,\forall k \in [2,N_t], \qquad \text{Equation 10:}$$

where $\zeta$ is a Siegel condition factor. In an exemplary embodiment, the Siegel condition factor is chosen from $[2, 4]$. Table 1 shows the pseudo-code for a non-limiting exemplary embodiment of a lattice reduction method with the Siegel condition (Line 9 of Table 1) and forms the starting point of other embodiments of the present invention.

TABLE 1

Exemplary Embodiment of a Lattice Reduction Method 100

```
Line 1   [Q̃,R̃,T] = QR (H̄); k = 2; g = 1(1 + j)
Line 2   while k ≤ N_t
Line 3       for n = k − 1 : −1 : 1
Line 4           u = round (R̃_{n,k}/R̃_{n,n})             ⎫
Line 5           R̃_{1:n,k} = R̃_{1:n,k} − u · R̃_{1:n,n}   ⎬ size reduction
Line 6           T_{:,k} = T_{:,k} − u · T_{:,n}           ⎪
Line 7           g_n = g_n + u · g_k                        ⎭
Line 8       end
Line 9       if |R̃_{k−1,k−1}|² > ζ|R̃_{k,k}|²             Siegel condition
                                                            evaluation
Line 10                    1        ⎡ R̃*_{k−1,k}   R̃_{k,k}   ⎤
              Θ = ──────────────── ⎢                          ⎥
                  ‖R̃_{k−1:k,k}‖   ⎣ −R̃_{:k,k}    R̃_{k−1,k}  ⎦

Line 11      R̃_{k−1:k,k−1:N_t} = ΘR̃_{k−1:k,k−1:N_t}     ⎫ basis update
Line 12      Q̃_{:,k−1:k} = Q̃_{:,k−1:k}Θ^H                ⎭
Line 13      Swap (k − 1)-th and k-th columns in R̃ and T
Line 14      Swap (k − 1)-th and k-th rows in g
Line 15      k = max(k − 1, 2)
Line 16    else
Line 17      k = k + 1
Line 18    end
Line 19  end
```

In some embodiments of the present invention, if the original signal constellation set comprises the infinite complex integer plane, then the signal constellation set in the z-domain can also comprise the infinite complex integer plane. In some of these embodiments, during the initial detection step in the z-domain, the $Q_s$ function in Equation 6 can be replaced with the element-wise integer-rounding operation. The signal constellation set for M-ary Quadrature Amplitude Modulation (QAM), however, can be $S=\{s|\Re[s],\Im[s]\in A\}$, where $A=\{-\sqrt{M}+1,\ldots,-1,1,\ldots\sqrt{M}-1\}$. Therefore, Equation 5 can be reformulated such that detection can be carried out as if the real and imaginary parts of the original constellation set are drawn from the consecutive integers.

In an exemplary embodiment of the present invention, a new constellation set can be defined as $$\dot{S}=\left\{\dot{s}=\tfrac{1}{2}(s+1+j)\,\Big|\,s\in S\right\}.$$

The symbol vector in Equation 1 can then be characterized as a symbol vector $\dot{s}\in\dot{S}^{N_t}$ that has been transformed by $2\dot{s}-1(1+j)$. This idea can be applied to Equation 5 by making the substitution $\dot{x}^{(MMSE)}=2\dot{x}^{(MMSE)}-1(1+j)$ and simplifying, $$\bar{R}\dot{x}^{(MMSE)}=\tfrac{1}{2}\bar{Q}^H(\bar{y}+\bar{H}1(1+j)) \qquad \text{Equation 11}$$

In an exemplary embodiment of the present invention, Equation 11 can allow for the utilization of the CLLL algorithm with the MMSE-SIC detector in Equation 6. The CLLL algorithm can return the factorization $\bar{H}T=\tilde{Q}\tilde{R}$, where $\tilde{Q}$ can be a $(N_r+N_t)\times N_t$ matrix. Applying this relationship to Equation 11 yields, $$\tilde{R}T^{-1}\dot{x}^{(MMSE)}=\tfrac{1}{2}(\tilde{Q}^H\bar{y}+\tilde{R}T^{-1}1(1+j)) \qquad \text{Equation 12}$$

Using the substitution of $z=T^{-1}\dot{x}^{(MMSE)}$ and partitioning $\tilde{Q}$ into a $N_r\times N_t$ matrix $\tilde{Q}^{(1)}$ and $N_t\times N_t$ matrix $\tilde{Q}^{(2)}$, such that $\tilde{Q}=[(Q^{(1)})^T(Q^{(2)})^T]^T$, a new form of Equation 5 is represented by, $$\tilde{R}z=\tfrac{1}{2}\left((\tilde{Q}^{(1)})^H y+\tilde{R}T^{-1}1(1+j)\right) \qquad \text{Equation 13}$$

Detection in the z-domain can be completed by first computing $\hat{z}$ using Equation 6 with the $Q_S$ function replaced with the integer-rounding function. Then, the estimated symbol vector can be determined by computing $\hat{s}=Q_S[2T\hat{z}-1(1+j)]$. Hence, CLLL-MMSE-SIC detection for QAM can require, in an exemplary embodiment, that the CLLL algorithm generate the vector $T^{-1}1(1+j)$ in addition to $\tilde{Q}^{(1)}$, $\tilde{R}$, and T.

Some embodiments of the invention provide an LR method that comprises providing a channel matrix, H, corresponding to a channel in a MIMO communication system 105. In some embodiments of the LR method, the step of preprocessing the channel matrix to form at least an upper triangular matrix 110 can be preprocessing the channel matrix, $\bar{H}$, to generate a unitary $\tilde{Q}^{(1)}$ matrix, an upper triangular $\tilde{R}$ matrix, unimodular T matrices and the vector $T^{-1}1(1+j)$ (denoted by g in Table 1). An exemplary embodiment of the invention preprocesses the channel matrix, $\bar{H}$, by performing a QR-decomposition preprocessing step on the channel matrix. An exemplary embodiment of QR-decomposition preprocessing is illustrated in Line 1 of Table 1. Some embodiments of the LR method comprise implementing a size reduction process on elements of the $\tilde{R}$ matrix 115. In an exemplary LR method, implementing a size reduction process on elements of the $\tilde{R}$ matrix comprises satisfying Equation 8 for progressively larger upper-left square sub-matrices of $\tilde{R}$.

Additionally, some embodiments of the LR method comprise implementing an iterative basis update process 120. In an exemplary embodiment of the LR method, implementing an iterative basis update process 120 comprises satisfying Equation 9 for progressively larger upper-left square sub-matrices of $\tilde{R}$. In another exemplary embodiment of the LR method, implementing an iterative basis update process 120 comprises satisfying Equation 10 for progressively larger upper-left square sub-matrices of $\tilde{R}$. Some embodiments of the invention iteratively update g and the $\tilde{Q}^{(1)}$, $\tilde{R}$, and T matrices as needed. In some embodiments, the variable k in Table 1 can indicate the size of a currently active upper-left square sub-matrix of $\tilde{R}$.

In some embodiments of the present invention, it is desired to implement an LR system in fixed point hardware. Careful magnitude analysis of the $\tilde{R}$ elements, based on the system model in Equation 1 and LR method operation, can aid in avoiding undesirable overflow behaviors. In some embodiments of the invention, parts of the LR method are modified to reduce the method complexity and streamline the hardware realization.

In some embodiments of the invention, preprocessing the channel matrix, $\overline{H}$, using QR-decomposition preserves the column energy of $\overline{H}$. In these embodiments, the squared magnitudes of the $\tilde{R}$ elements in column i before the start of the LR method can be upper bounded by the column energy in the i-th $\overline{H}$ column for a constant $\sigma_w = \sigma_{max}$ using, $$\|\overline{h}_i\|^2 = \|h_i\|^2 + \sigma_{max}^2 \qquad \text{Equation 14:}$$

where $2\|h_i\|^2$ can be Chi-square distributed with degrees of freedom $2N_r$ and $\sigma_{max}$ can be the maximum value of $\sigma_w$ when the step of preprocessing the channel matrix 105 is included in the LR method.

To determine an upper bound $B_{init}$ for the magnitudes of the $\tilde{R}$ elements, some embodiments of the present invention treat each $\overline{H}$ matrix as a generation of $N_t$ i.i.d. trials of the random variable in Equation 14. Therefore, $B_{init}$ can be determined according to a target overflow probability. In an exemplary embodiment of the present invention, the probability of the column norm $\|\overline{h}_n\|$ a bound $B_{init}$ corresponds to one overflow event every 22.7 years for an 802.11n system that requires the processing of 128 MIMO channel matrices every four microseconds. In some embodiments, if saturation quantization at the receiver is adopted, $B_{init}$ can safely upper bound the elements of $\tilde{R}$ at the start of the LR method. In an exemplary embodiment, when $N_r = N_t = 4$ and $\sigma_{max} = 0.62(4.15 \text{ dB})$, then $B_{init} = 2^{2.82}$.

In some embodiments, the diagonal elements of $\tilde{R}$ can be upper bounded by $B_{init}$ during operation of the LR method, which can use the Lovasz condition. Because at Line 11 in Table 1 the $\tilde{R}_{k-1,k}$ element satisfies the size reduction condition of Equation 8, and $\zeta \geq 2$ it follows that diagonal elements of $\tilde{R}$ can be upper bounded by $B_{init}$ in embodiments of the invention where the Siegel condition is used. Further, in these embodiments where the Siegel condition is used, the magnitudes of the real and imaginary parts of the $\tilde{R}$ off-diagonal entries are bounded by $$\frac{1}{2} B_{init}$$

after implementing a size reduction process 115.

Some embodiments of the present invention involve modifications to a CLLL algorithm and can therefore be evaluated on both algorithm complexity reduction, BER performance, and preservation of numerical properties, including tightly bounded $\tilde{R}$ diagonal elements and tightly bounded size reduction operation results.

In an exemplary embodiment of the LR method, implementing a size reduction process comprises executing only the first inner-loop iteration, shown on Lines 4-7 of Table 1, during each outer loop iteration. In some of these embodiments of the present invention, the symbol vector can be substantially unchanged by executing only a first inner-loop iteration, as opposed to multiple inner-loop iterations, during each outer-loop iteration.

The following proof illustrates that the symbol vector can be substantially unchanged by executing only a first inner-loop iteration during each outer-loop iteration—i.e. that the symbol vector is substantially unaffected by the size reduction of the entire matrix. First, a matrix $A^{(i)}$ can be defined to be a unimodular matrix that has a one on each diagonal, arbitrary complex integers in the upper off-diagonal elements of the i-th column, and zero on the remaining matrix entries. It is then assumed that $Q_S$ in Equation 6 is the element-wise integer rounding operation. If $\hat{x}$ is the SIC solution when an arbitrary $N_t \times N_t$ invertible upper-triangular matrix R with complex elements and an $N_t \times 1$ complex vector b are used in the Equation 6 SIC recursion, then the elements of the SIC solution x', when $R' = RA^{(i)}$ and b are used in Equation 6, are then equal to, $$x'_n = \begin{cases} x_n & i \leq n \leq N_t \\ x_n - a_{n,i}^{(i)} x_i & 1 \leq n \leq i-1, \end{cases} \qquad \text{Equation P-1}$$

Given that only the i-th column elements of R' in rows of index less than i are affected, then $x'_n = x_n$ for $i \leq n \leq N_t$. Induction can then be used to prove that the second part of Equation P-1 is true for the base case $n = i - 1$. Then it can be assumed that Equation P-1 is true for $l \leq n \leq N_t$ and shown that Equation P-2 is true for $l - 1 \leq n \leq N_t$, where $2 \leq l \leq i - 2$.

Now let $\tilde{Q}\tilde{R} = \overline{H}T$ is the $\overline{H}$ (defined in Equation 3) factorization produced by a CLLL algorithm. Also let $\hat{z}$ be the SIC solution to Equation 13, $$\tilde{R}z = \frac{1}{2}\tilde{Q}^H(\overline{y} + \overline{H}1(1+j)) \qquad \text{Equation P-2}$$

where the right-hand side is written in equivalent form. The symbol vector estimate (before scaling, shifting, and quantization to the nearest symbol constellation) from this z-domain solution is then $\hat{s} = T\hat{z}$. Also let $\tilde{R}^{(i)} = \overline{R}^{(i-1)}B^{(i)}$ and $T^i = T^{(i-1)}B^{(i)}$ with $\tilde{R}^{(1)} = \tilde{R}$ and $T^{(1)} = T$. Let $B^{(i)}$ be generated by running the procedure in Table 2 with $\dot{R} = \tilde{R}^{(i-1)}$ initially. If $\tilde{R}$ is size-reduced to produce a new upper-triangular matrix $\tilde{R}' = R(B^{(2)} \ldots B^{(N_t)})$ and an updated unimodular matrix $T' = T(B^{(2)} \ldots B^{(N_t)})$, then the updated CLLL-MMSE-SIC symbol vector estimate $\hat{s}'$ (before scaling, shifting, and quantization to the nearest symbol constellation) is substantially unchanged, i.e. $\hat{s}' = \hat{s}$. Let $\hat{z}^{(i)}$ be the SIC solution to Equation P-2 that has $\tilde{R}$ replaced with $\tilde{R}^{(i)}$, and $\hat{s}^{(i)}$ is the subsequent symbol vector estimate. Then, because $\hat{s}' = \hat{s}^{(N_t)}$, induction on i can be used to prove $\hat{s}' = \hat{s}$. Beginning with the base case $i = 2$, Equation P-1 can be used to show that $\hat{s}^{(2)} = T^{(2)}\hat{z}^{(2)}\hat{s}$.

If it is assumed that $\hat{s}^{(i)}=\hat{s}$, then it can be shown that $\hat{s}^{(i+1)}=\hat{s}$ using, $$\hat{z}^{(i+1)} = \begin{bmatrix} z_1^{(i)} + u_{1,i+1} \hat{z}_{i+1}^{(i)} \\ \vdots \\ z_i^{(i)} + u_{i,i+1} \hat{z}_{i+1}^{(i)} \\ \hat{z}_{i+1}^{(i)} \\ \vdots \\ z_{N_t}^{(i)} \end{bmatrix}, \quad \text{Equation P-3}$$

and $$T^{(i+1)} = \begin{bmatrix} | & & | & | & | & & | \\ T_1^{(i)} & \cdots & T_{i1}^{(i)} & T_{1+1}^{(i+1)} & T_{1+2}^{(i)} & \cdots & T_{N_t}^{(i)} \\ | & & | & | & | & & | \end{bmatrix} \quad \text{Equation P-4}$$

where $$T_{i+1}^{(i+1)} = T_{i+1}^{(i)} - \sum_{j=1}^{(i)} u_{j,i+1} T_j^{(i)}.$$

Finally, $$\hat{s}^{(i+1)} = T^{(i+1)} \hat{z}^{(i+1)} \quad \text{Equation P-5}$$
$$= \sum_{j=1}^{N_t} T_j^{(i)} \hat{z}_j^{(i)} + \sum_{j=1}^{i} T_j^{(i)} (\hat{z}_{i+1}^{(i)} u_{j,i+1} - \hat{z}_{i+1}^{(i)} u_{j,i+1})$$
$$= T^{(i)} \hat{z}^{(i)}$$
$$= \hat{s}^{(i)}$$
$$= \hat{s}$$

TABLE 2

Generations of $B^{(i)}$ Matrices for Full Size Reduction on the i-th column of $\tilde{R}$

| Line 1 | $B(i) = I_{N_t}$ |
| Line 2 | for n = i − 1 : −1 : 1 |
| Line 3 | $u_{n,i} = $ round $(\tilde{R}_{n,i} / \tilde{R}_{n,n})$; |
| Line 4 | $\tilde{R}_i = \tilde{R}_i - u_{n,i} \cdot \tilde{R}_n$; $B_i^{(i)} = u_{n,i} \cdot B_n^{(i)}$; |
| Line 5 | end |

This proof also illustrates that in some embodiments of the present invention, the symbol vector estimate is substantially unaffected by implementing a size reduction process 115 comprising performing operations on $\tilde{R}_{k-1,k}$ elements for $2 \leq k \leq N_t$. Although these embodiments have lower complexity than conventional CLLL algorithms, the $\tilde{R}$ elements that do not undergo size reduction operations can increase uncontrollably, which is not desirable in fixed-point hardware implementation.

Therefore, in some embodiments of the present invention implementing a size reduction process 115 can be implementing a relaxed size reduction process. The relaxed size reduction process comprises choosing a first relaxed size reduction parameter $\phi_{n,k}$ for an element in a first-off-diagonal of the $\tilde{R}$ matrix, determining whether a relaxed size reduction condition is satisfied, and performing an iterative size reduction algorithm on an element of the $\tilde{R}$ matrix if the relaxed size reduction condition is not satisfied. In an exemplary embodiment, the value of the first relaxed size reduction parameter is at least 0.5. In another exemplary embodiment, for the $\tilde{R}$ matrix and a given $\delta$ in Table 1, the $\tilde{R}_{n,k}$ element for n<k satisfies a relaxed size reduction condition, which is defined by $$\phi_{n,k} \geq \frac{1}{2},$$

if $\Re[\tilde{R}_{n,k}] \leq \phi_{n,k} |\tilde{R}_{n,n}|$ and $\Im[\tilde{R}_{n,k}] \leq \phi_{n,k} |\tilde{R}_{n,n}|$ are satisfied. In some embodiments of the invention, a size reduction process is performed on $\tilde{R}_{n,k}$ elements for n<k−1 only when the relaxed size reduction condition is not satisfied.

As the value of the relaxed size reduction parameter $\phi_{n,k}$ increases, how often the size reduction algorithm is performed decreases, which decreases the complexity of the algorithm while maintaining bounded size reduction results. Therefore, some embodiments of the present invention comprise choosing a second relaxed size reduction parameter, which is greater than the first relaxed size reduction parameter, for an element in a second or third off-diagonal of the $\tilde{R}$ matrix. In an exemplary embodiment the value of the second relaxed size reduction parameter is set to greater than 1.5.

Some embodiments of the present invention comprise implementing an iterative basis update on elements of the $\tilde{R}$ matrix 120. During the step of implementing a basis update process 120, the $\tilde{R}_{k,k-1}$ element, which becomes the k-th $\tilde{R}$ diagonal if the column swap in Line 13 of Table 1 is performed, can be updated at Line 11 in Table 1, such that the magnitude of this element can be less than or equal to the magnitude of the $\tilde{R}_{k-1,k-1}$ element. In some embodiments, the $\tilde{R}_{k,k-1}$ element, which can become the (k−1)-th $\tilde{R}$ diagonal after the column swap, can be updated such that the squared magnitude is equal to $|\tilde{R}_{k,k}|^2 + |\tilde{R}_{k-1,k}|^2$. In some embodiments, by applying a failed Siegel condition and a relaxed size reduction condition, the following is true, $$|\tilde{R}_{k,k}|^2 + |\tilde{R}_{k-1,k}|^2 < \left(\frac{1}{\varsigma} + 2\phi_{k-1,k}^2\right) |\tilde{R}_{k-1,k-1}|^2 \quad \text{Equation 15}$$

In some embodiments, if the size reduction condition on the $\tilde{R}_{k-1,k}$ element is relaxed, then implementing a basis update process 120 can increase the maximum squared magnitude of the $\tilde{R}$ diagonal elements by a factor of $$\left(\frac{1}{\varsigma} + 2\phi_{k-1,k}^2\right).$$

Therefore, if the maximum number of basis updates in an iterative basis update process is G and all $\phi_{k-1,k}$ are the same, a new upper bound for the magnitude of the $\tilde{R}$ diagonal elements can be defined as, $$B = \begin{cases} B_{init} & \frac{1}{\varsigma} + 2\phi_{k-1,k}^2 \leq 1 \\ \left(\frac{1}{\varsigma} + 2\phi_{k-1,k}^2\right)^{\frac{G}{2}} B_{init} & \frac{1}{\varsigma} + 2\phi_{k-1,k}^2 > 1 \end{cases} \quad \text{Equation 16}$$

As discussed above, in some embodiments of the present invention comprising implementing a relaxed size reduction process, a size reduction operation is required for each inner-loop iteration, Lines 4-7 of Table 1 if the $\tilde{R}_{n,k}$ element in Line 5 of Table 1 does not satisfy a relaxed size reduction condition. In some of these embodiments, the invention further comprises forcing a size reduction operation each inner-loop iteration when the magnitude of the real or imaginary part of the $\tilde{R}_{n,k}$ element in Line 5 exceeds $$\frac{1}{2}B.$$

In some embodiments, for the size reduction operations on the k-th column, $\tilde{R}'_{n,k}$ can represent an intermediate value of $\tilde{R}_{n,k}$ after the first (k−n−1) inner-loop iterations but before the size reduction operations on the n-th row element of the k-th column. Additionally, $u_{l,k}$ can be equal to zero when execution of the (k−1)-th inner-loop iteration does not occur ($\tilde{R}_{n,k}$ at Line 4 of Table 1 satisfies the relaxed size reduction condition and the $$\frac{1}{2}B$$

upper bound) and can be equal to the u value in Line 4 of Table 1 at the (k−1)-th inner-loop iteration when execution of this inner-loop iteration does occur. This intermediate size reduction result can be written as:

$$\tilde{R}'_{n,k} = \tilde{R}_{n,k} - \sum_{l=n+1}^{k-1} u_{l,k} \tilde{R}_{n,l} \qquad \text{Equation 17}$$

The summation on the right-hand side of Equation 17 involves $\tilde{R}_{n,l}$ element, which can be the result of size reduction operations during previous outer loops (when the system or method was operating on upper-left square matrices smaller than k×k). In some embodiments, by applying the relaxed size reduction condition to the $\tilde{R}_{n,l}$ element, the real component of $\tilde{R}'_{n,k}$ in Equation 17 can be upper bound by:

$$|\mathcal{R}[\tilde{R}_{n,k}]| + \sum_{l=n+1}^{k-1} (|\mathcal{R}[u_{l,k}]| + |\mathfrak{I}[u_{l,k}]|) \phi_{n,l} |\tilde{R}_{n,n}| \qquad \text{Equation 18}$$

In some embodiments, to remove the dependence of Equation 18 on the $u_{l,k}$ from the definition of $\tilde{R}_{n,k}$ elements, the enforcement of the absolute $$\frac{1}{2}B$$

upper bound results in the following relation, $$|\mathcal{R}[\tilde{R}'_{l,k}] - \mathcal{R}[\tilde{R}'_{l,k}]\tilde{R}'_{l,l}| < \frac{1}{2}B \qquad \text{Equation 19}$$

Using signed magnitude techniques, this can be written as, $$|\mathcal{R}[u_{l,k}]||\tilde{R}_{l,l}| < \frac{1}{2}B + |\mathcal{R}[\tilde{R}'_{l,k}]| \qquad \text{Equation 20}$$

In some embodiments, to remove the dependence of Equation 20 on $\tilde{R}_{l,l}$, the induction proof discussed earlier can be slightly modified to accommodate the Siegel condition in Equation 10, which results in, $$|\tilde{R}_{n,n}| < \varsigma^{\frac{l-n}{2}} |\tilde{R}_{l,l}| \qquad \text{Equation 21}$$

Additionally, in some embodiments, the substitution of Equation 21 into Equation 18 followed by substitution of Equation 20 results in, $$|\mathcal{R}[\tilde{R}'_{n,k}]| < |\mathcal{R}[\tilde{R}_{n,k}]| + \sum_{l=n+1}^{k-1} \varsigma^{\frac{l-n}{2}} \phi_{n,l}(B + |\mathcal{R}[\tilde{R}'_{l,k}]| + |\mathfrak{I}[\tilde{R}'_{l,k}]|) \qquad \text{Equation 22}$$

In some embodiments, an upper bound on the magnitude of the $\mathfrak{I}[\tilde{R}'_{n,k}]$ can be obtained by repeating the steps in Equations 18-22.

The upper bounds for n=k−1 can be trivially determined and then recursively substituted as the upper bounds for smaller n are determined. If the $\phi_{n,k}$'s do not change during execution of the system, then, $$|\mathcal{R}[\tilde{R}'_{n,k}]| < \gamma_{n,k} B + |\mathcal{R}[\tilde{R}_{n,k}]| + \sum_{p=n+1}^{k-1} \alpha_{p,k}(|\mathcal{R}[\tilde{R}_{p,k}]| + |\mathfrak{I}[\tilde{R}_{p,k}]|) \qquad \text{Equation 23}$$

where the $\alpha_{p,k}$'s and $\gamma_{n,k}$'s can be determined during the recursive substitution process.

In some embodiments, at the end of an outer loop for a particular k, $|\tilde{R}_{p,k}|$ be upper bounded by B for p=k−1 as a result of possible basis updates and by B/$\sqrt{2}$ for p≠k−1, when a basis update does not occur. Therefore, in some embodiments, the maximum energy that can be re-distributed among the $\tilde{R}_{1:k-1,k}$ sub-vector elements as the result of subsequent basis updates (as Siegel conditions fail and a LR system or method operates on smaller matrix sizes) can be shown by, $$\sum_{p=1}^{k-1} |\tilde{R}_{p,k}|^2 \leq B^2 \left(1 + \frac{k-2}{2}\right) \qquad \text{Equation 24}$$

To maximize the right-hand side in Equation 23, in some embodiments, it can be assumed that subsequent basis updates distribute the energy among the sub-vector elements to maximize the upper bound. By solving this constrained maximum problem, $$|\mathcal{R}[\tilde{R}'_{n,k}]| < B\left(\gamma_{n,k} + \sqrt{k\left(\frac{1}{2} + \sum_{p=n+1}^{k-1} \alpha_{p,k}^2\right)}\right) \qquad \text{Equation 25}$$

and a similar bound can be reached for the imaginary components. In some embodiments of the present invention, the LR systems and methods can be safely utilized in fixed-point implementations by designing hardware around these upper bounds.

In an exemplary embodiment of the present invention, implementing a size reduction process 115 comprises computing an integer-rounded quotient (shown in Line 4 of Table 1). In some embodiments, however, this computation can often be avoided by noticing that $$|\mathcal{R}[\tilde{R}_{n,k}]| < \frac{1}{2}|\tilde{R}_{n,n}|$$

implies $\mathcal{R}[u]=0$ and $$\frac{1}{2}|\tilde{R}_{n,n}| \leq |\mathcal{R}[\tilde{R}_{n,k}]| < \frac{3}{2}|\tilde{R}_{n,n}|$$

implies $\mathcal{R}[u]|=1$. In some embodiments, the case of $\mathcal{R}[u]|$, $|\Im[u]|>1$ can be handled by performing a relaxed size reduction process that comprises using an integer rounded-divider based on a single Newton-Raphson (NR) iteration if a first or second relaxed size reduction condition is not satisfied. These embodiments can take advantage of the divisor reuse that can be inherent in the LR method. In some embodiments, if it is assumed that reciprocals are being buffered, this reciprocation based approach is also useful for the subsequent detection step because the stored reciprocals can be used for the SIC recursion in Equation 6.

In some embodiments of the present invention, a formal description of the NR iteration based division method is used. To compute n/d for n,d>0, d can be first normalized such that $d2^{\psi}=d_n$, where $1 \leq d_n < 2$. An estimate $r'_n$ of the reciprocal of $d_n$ can then be computed from an initial estimate $r_n+\epsilon$, which can be obtained from a look-up table (LUT), using, $$r'_n = (r_n+\epsilon)(2-d_n(r_n+\epsilon))$$ Equation 26:

where $r_n=1/d_n$ and $\epsilon$ can be the error of the initial estimate.

In some embodiments of the present invention Equation 26 is altered for a fixed-point hardware implementation. This can be done by introducing the notation {w.f} to indicate an unsigned number representation having w integer bits and f fraction bits, letting the function $Q_1$ indicate truncation quantization to {2.(f+1)}, and letting the function $Q_2$ indicate truncation quantization to {2.f}. Some embodiments also allow an additional LUT for $(r_n+\epsilon)^2$. If it is assumed that both n and d have {w.f} representation and the $(r_n+\epsilon)$ LUT has {1.a} representation, then Equation 26 can be modified, which results in, $$r'_n = 2(r_n+\epsilon) - Q_2[(Q_1[d_n+2^{-(f+1)}])(r_n+\epsilon)^2] - 2^{-f}$$ Equation 27:

In some embodiments, if $\epsilon'$ can be the reciprocal error such that $r'_n = r_n+\epsilon'$, then $\epsilon'<0$. The integer-rounded quotient can then be found by computing $q'=n2^{\psi}r'_n$ and then determining round(q'). If q=n/d, then for a fixed-point NR formulation in Equation 27, the following is true:

$$-\left(\frac{1}{2}+\varepsilon_q\right) < \xi < \frac{1}{2}$$ Equation 28 where $\epsilon_q=q-q'$ and $\xi=$round(q')−q. Equation 28 can be proven true. Because $\epsilon'<0$, it follows that $\epsilon_q>0$. Then round(q') satisfies $$q' - \frac{1}{2} < \text{round}(q') \leq q' + \frac{1}{2},$$

which can be rewritten as $$-\left(\frac{1}{2}+\varepsilon_q\right) < \xi \leq \frac{1}{2}-\varepsilon_q.$$

Because the upper bound of this interval is $$\frac{1}{2}, \xi$$

satisfies Equation 28.

In some embodiments, round(q') can be computed by first computing $nr'_n$ to f+1 bits of precision (truncating the remaining bits), then applying $2^{\psi}$, and rounding to the nearest integer.

In some embodiments, an upper bound $M_{\gamma,a}$ for the relative error $(|n\epsilon'2^{\psi}|/q)$ of the NR formulation in Equation 27 is derived, where $2^{\gamma}$ can be the number of entries in each LUT. This relative error allows some embodiments of the invention to take advantage of the relaxed size reduction condition. In an exemplary embodiment, given that the fixed-point NR in Equation 27 that has a maximum relative error $M_{\gamma,a}$ is used to compute the u for size reduction on the $\tilde{R}_{n,k}$ (Line 4 in Table 1), the relaxed size reduction condition for this entry can be satisfied if, $$\left|\frac{\mathcal{R}[\tilde{R}_{n,k}]}{\tilde{R}_{n,m}}\right|, \left|\frac{\mathcal{I}[\tilde{R}_{n,k}]}{\tilde{R}_{n,m}}\right| < \frac{\phi_{n,k}-\frac{1}{2}}{M_{\gamma,a}}$$ Equation 29 where $\phi_{n,k}$ can be the relaxed size reduction condition factor associated with the $\tilde{R}_{n,k}$ entry. Equation 29 can be proven true by letting u' be the integer-rounded quotient produced by using the fixed-point NR formulation. If $n=\mathcal{R}[\tilde{R}_{n,k}]$ and $d=|\tilde{R}_{n,n}|$, then $\mathcal{R}[u']=$round(q'). Equation 28 then implies, $$-\left(\frac{1}{2}+\varepsilon_q\right) + \left|\frac{\mathcal{R}[\tilde{R}_{n,k}]}{\tilde{R}_{n,n}}\right| < |\mathcal{R}[u']| < \left|\frac{\mathcal{R}[\tilde{R}_{n,k}]}{\tilde{R}_{n,n}}\right| + \frac{1}{2}$$ Equation 30

The absolute error $\epsilon_q$ can be upper bounded by $$\left|\frac{\mathcal{R}[\tilde{R}_{n,k}]}{\tilde{R}_{n,n}}\right| M_{\gamma,a},$$

which, in accordance with Equation 29, is bounded by $$\left(\phi_{n,k}-\frac{1}{2}\right).$$

If this result is applied to the lower bound in Equation 30 and the $$\left(\phi_{n,k} \geq \frac{1}{2}\right)$$

assumption is applied to the upper bound in Equation 30, then, $$-\phi_{n,k} + \left|\frac{\Re[\tilde{R}_{n,k}]}{\tilde{R}_{n,n}}\right| < |\Re[u']| < \left|\frac{\Re[\tilde{R}_{n,k}]}{\tilde{R}_{n,n}}\right| + \phi_{n,k} \qquad \text{Equation 31}$$

Equation 31 demonstrates that in some embodiments where $|\Re[u']|$ is used for the magnitude of the real part of u in Line 5 of Table 1, then the real part of the updated $\tilde{R}_{n,k}$ entry can satisfy the $\phi_{n,k}$ relaxed size reduction condition. These same arguments can be used to prove that in some embodiments where $|\Im[u']|$ is used for the magnitude of the imaginary part of u in Line 5 of Table 1, then the imaginary part of the updated $\tilde{R}_{n,k}$ entry can satisfy the $\phi_{n,k}$ relaxed size reduction condition.

In some embodiments, given a fixed-point NR in Equation 27 that has a maximum relative error $M_{\gamma,a}$, Equation 29 is satisfied if, $$|\Re[u']|, |\Im[u']| < \frac{1-M_{\gamma,a}}{M_{\gamma,a}}\left(\phi_{n,k} - \frac{1}{2}\right) - \frac{1}{2} \qquad \text{Equation 32}$$

Equation 32 can be proven true because the application of Equation 28 and $$\varepsilon_q < \left\|\frac{\Re[\tilde{R}_{n,k}]}{\tilde{R}_{n,n}}\right\| M_{\gamma,a}$$

together imply that $$-\frac{1}{2} + \left\|\frac{\Re[\tilde{R}_{n,k}]}{\tilde{R}_{n,n}}\right\|(1 - M_{\gamma,a}) < |\Re[u']|.$$

This inequality, when reconciled with Equation 32, implies that Equation 29 is true. These same arguments can be used to prove Equation 32 true for $|\Im[u']|$.

In some embodiments of the present invention, in accordance with Equation 32, it is not necessary to perform extra rounding error detection and correction proposed by some conventional systems. When Equation 32 is not satisfied, this extra logic remains unnecessary if LR iterations are repeated until all u' values generated during an iteration satisfy Equation 32 and all off-diagonal elements in the k-th column of $\tilde{R}$ satisfy the $$\frac{1}{2}B$$

absolute upper bound after the size reduction process is performed for that iteration. Because computed u' component magnitudes are always less than or equal to the actual component magnitudes, the previous analysis of the relaxed size reduction condition remains valid.

Figure 2:
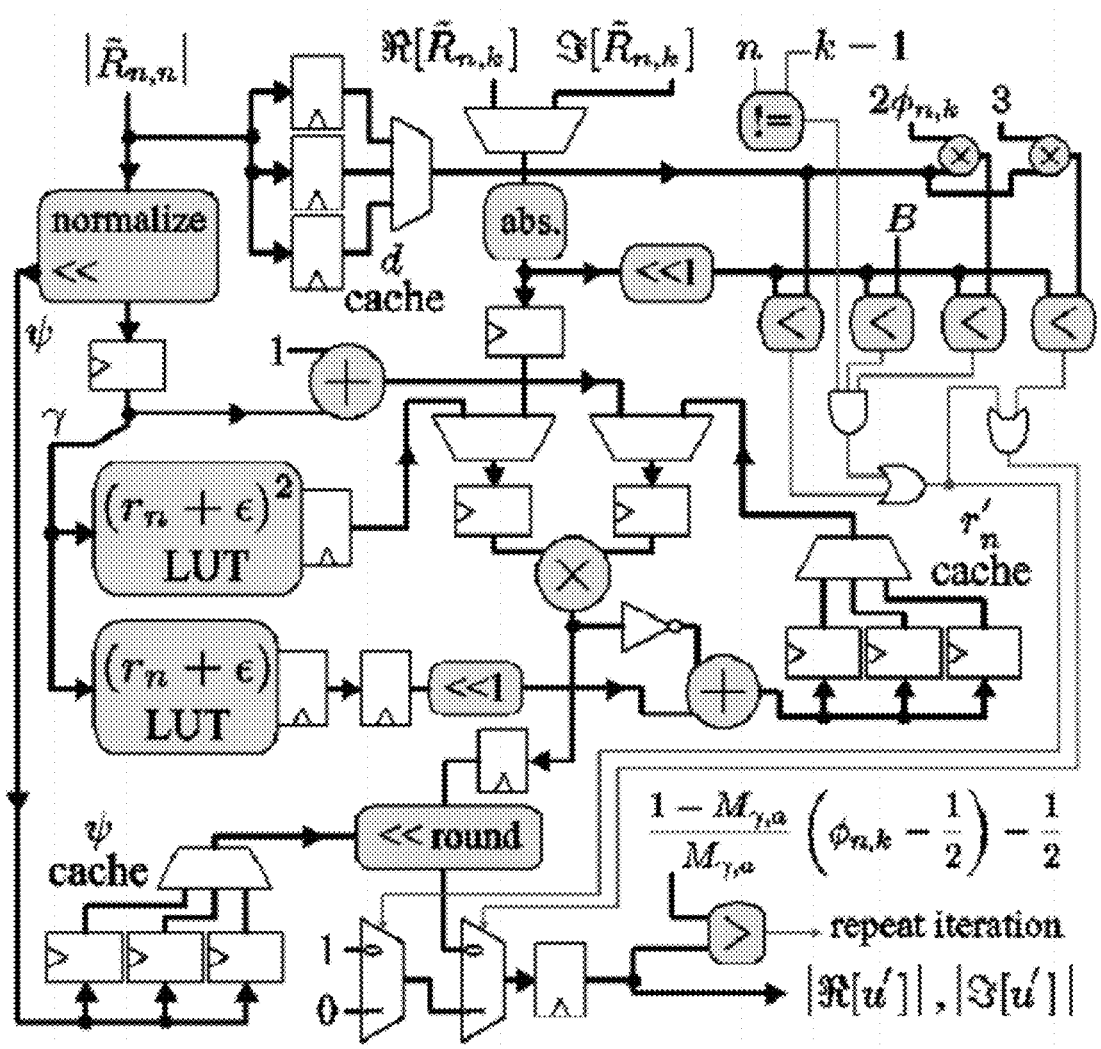
FIG. 2 provides a schematic diagram for an exemplary embodiment of a single Newton-Raphson iteration-based integer-rounded divider.

FIG. 2 provides a schematic diagram for an exemplary embodiment of a single Newton-Raphson iteration-based integer-rounded divider. In the exemplary embodiment, the reciprocation datapath, which can compute Equation 27 in four cycles, shares a multiplier with the reciprocal multiplication datapath, which can require four cycles. The divisors and corresponding reciprocals (normalized reciprocal $r'_n$ and shift value $\psi$) can be stored in a cache for use during subsequent iterations of the LR method. Further, a collection of comparators and straightforward logic can be used to detect trivial u values and evaluate the relaxed size reduction condition.

Some embodiments of the invention provide an LR method comprising implementing a basis update process 120. In some embodiments of the present invention, the implementing a basis update process 120 can comprise evaluating a Lovasz condition—as discussed earlier. In an exemplary embodiment of the present invention, implementing a basis update process 120 can comprise evaluating a Siegel condition. In another exemplary embodiment, the implementing a basis update process 120 can comprise computing a 2×2 unitary matrix, which can be denoted by $\Theta$. In systems and methods of the present invention, evaluating the Siegel condition (Line 9 in Table 1) can be relatively straightforward while computation of the $\Theta$ (Line 10 in Table 1) can require the inverse square-root operation, which has a high hardware complexity. Therefore, some embodiments of the present invention use a numerically stable and efficient method to compute $\Theta$, which becomes apparent by forming the vector, $$v=[|\tilde{R}_{k,k}|\,\Re[\tilde{R}_{k-1,k}]\,\Im[\tilde{R}_{k-1,k}]]^T \qquad \text{Equation 33:}$$

and viewing these computations as a vector normalization problem. If this is done, $\Theta$ can be formed from the elements of $v/\|v\|$, and the updated (k−1)-th diagonal after the $\Theta$ multiplication in Line 11 of Table 1 and column swap in Line 13 of Table 1 is $\|v\|$.

Some embodiments of the present invention solve this vector normalization problem by applying the Householder CORDIC algorithm. In an exemplary embodiment, vectoring iterations (rotating a vector to an axis) and rotation iterations (rotating a vector around an arbitrary axis) can be performed by low hardware complexity shifts and additions. A sequence of J Householder vectoring iterations can be used to compute $\|v\|$ to a certain precision within a constant CORDIC gain factor, $C=\Pi_{i=1}^{J}(1+2^{-2i+1})$, $$C(\|v\|+\epsilon)e_1 = A^{(J)}\ldots A^{(1)}v \qquad \text{Equation 34:}$$

where $A^{(i)}$ can be determined from the sign of the vector elements at the end of each vectoring iteration and $(A^{(i)})^T A^{(i)} = (1+2^{-2i+1})^2 I$, $e_1=[1\ 0\ 0]^T$, and $\epsilon$ is an error term introduced by the finite number of vectoring iterations, J. J can be defined to be a precision parameter equal to the number of vectoring iterations performed to compute $\|v\|$. In an exemplary embodiment J is equal to nine. However, J can also be equal to any other positive integer. In some embodiments, multiplication by $A^{(i)}$ can be implemented with addition operations and bit-shifts of length i and 2i, which can be easily realized on an FPGA using J:1 multiplexers. $v/\|v\|$ can then be computed by rotating the vector $(1/C)e_1$ using the transpose of the $A^{(i)}$ matrices in the opposite order:

$$(A^{(i)})^T \ldots (A^{(J)})^T\left(\frac{1}{C}e_1\right) = \frac{v}{\|v\|+\varepsilon} \qquad \text{Equation 35}$$

Due to the reversed order that the $(A^{(i)})^T$ matrices are applied in Equation 35, the normalized vector computation begins after these matrices are determined. In these embodiments, for a single-iteration-per-cycle Householder CORDIC architecture, 2J cycles can be required for the $\Theta$ matrix computation. Therefore, some embodiments of the present invention overlap the computation of ||v|| and v/||v||. This can be done with a slight manipulation of Equation 34, which results in, $$\frac{v_i}{\|v\|+\varepsilon} = e_1^T A^{(J)} \ldots A^{(1)}\left(\frac{1}{C}e_1\right)$$

Equation 36 where $v_i$ can be the i-th element of v and $e_i$ can be the i-th standard Euclidean basis vector. Thus, in some embodiments of the present invention, in accordance with Equation 36, the i-th element of v/||v|| can be computed by rotating $e_i/C$ using the $A^{(i)}$ in the same order as applied in the vectoring iterations.

In an exemplary embodiment, Equations 34 and 36 are implemented as part of the basis update process by employing a single iteration-per-cycle Householder CORDIC architecture that has been unrolled and includes multiple pipeline stages configured to concurrently execute at least one vectoring iteration and at least one rotation iteration. In an exemplary embodiment, the architecture includes four pipeline stages.

Figure 3:
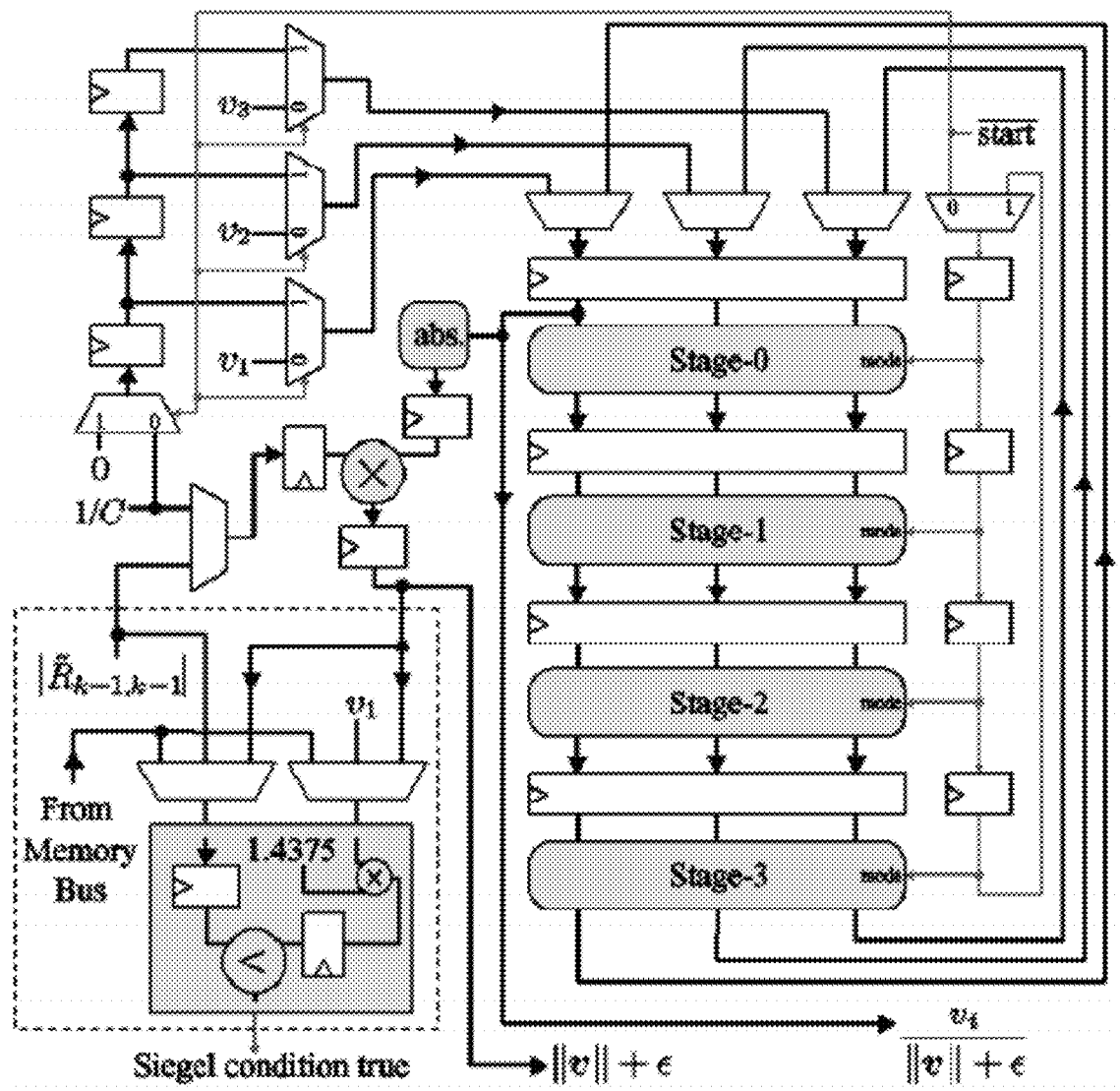
FIG. 3 provides an schematic diagram for an exemplary embodiment of a single iteration per cycle Householder CORDIC architecture.

FIG. 3 provides an schematic diagram for an exemplary embodiment of a single iteration per cycle Householder CORDIC architecture. In this exemplary embodiment, the single iteration per cycle Householder CORDIC architecture has been unrolled and includes multiple pipeline stages configured to concurrently execute at least one vectoring iteration and at least one rotation iteration. In some embodiments, each pipeline stage can operate in vectoring mode (compute an $A^{(i)}$ and then apply $A^{(i)}$ on the input vector) or rotation mode (apply a previously computed $A^{(i)}$ on the input vector). The pipeline can be initially filled by inputting v into stage-0 in vectoring mode during the first cycle of initialization and inputting $e_1/C$, $e_2/C$, and $e_3/C$ in rotation mode during the next three cycles, respectively. The results of these vectoring and rotations proceed through the pipeline, feeding back to stage-0 when the end of the pipeline is reached. After J cycles, the computed C(||v||+ϵ) can exit the pipeline, and the computed elements of v/(||v||+ϵ) can exit the pipeline in the following three cycles. Hence, embodiments of the invention adopting this architecture can compute Θ in J+3 cycles. Although, these embodiments may require four times the number of adders and shifters as embodiments using the approach in Equation 35, the complexity of the individual shifters is considerably decreased. Further, because unrolling can allow part of the shifting operations to be performed with wire shifts, each stage can have [J/(number of pipeline stages)]:1 multiplexers. In addition, the unrolling in some embodiments allows more effective register re-timing because automated synthesis tools can move registers across the stages to improve the critical path.

In some embodiments of the present invention, performing a basis update process occurs and the Θ matrix is computed only when the Siegel condition is false. Thus, Θ may not be speculatively computed. Therefore, in some embodiments of the LR method, implementing a basis update process 120, comprises employing a low complexity method for evaluating the Siegel condition. In, an exemplary LR method, implementing a basis update process 120 can be implementing a rapid basis update process on diagonal elements in an upper triangular matrix R̃. The process can comprise choosing an efficient Siegel condition factor ζ, such that a first Siegel condition can be evaluated between a first pair of adjacent diagonal elements of the upper triangular matrix without using multiplication operations. The first pair of adjacent diagonal elements can comprise a first diagonal element and a second diagonal element. In an exemplary embodiment, the Siegel condition factor is chosen to be 2.06640625. Those skilled in the art will appreciate that the Siegel condition factor can be chosen in accordance with the demands of a particular implementation of the present invention. In another exemplary embodiment, implementing a rapid basis update process comprises evaluating whether the first Siegel condition is satisfied between the first pair of adjacent diagonal elements without using multiplication operations. In yet another exemplary embodiment, implementing a rapid basis update process comprises evaluating whether a second Siegel condition is satisfied between a second pair of adjacent diagonal elements of the upper triangular matrix without using multiplication operations. The second pair of adjacent diagonal elements can comprise the second diagonal element and a third diagonal element. In still yet another exemplary embodiment, implementing a rapid basis update process comprises evaluating whether a third Siegel condition factor is satisfied between a third pair of adjacent diagonal elements of the upper triangular matrix without using multiplication operations. The third pair of adjacent diagonal elements can comprise the third diagonal element and a fourth diagonal element.

In some embodiments, the complexity of evaluating the Siegel condition is determined in part by the value of the Siegel condition factor ζ. Therefore, some embodiments implement the rapid basis update process with an efficient Siegel condition factor. An efficient Siegel condition factor is a Siegel condition factor that simplifies the complexity of evaluating the Siegel condition. In an exemplary embodiment, the efficient Siegel condition factor is a Siegel condition factor with a value such that the Siegel condition can be evaluated without using multiplication operations. In another exemplary embodiment, the efficient Siegel condition factor has a value such that the Siegel can be evaluated with a comparator and two adders.

Evaluating the Siegel condition with a Siegel condition parameter ζ=2.06640625 is equivalent to evaluating the following:

$$|\tilde{R}_{k-1,k-1}| \le (1+2^{-1}-2^{-4})\tilde{R}_{k,k}$$

Equation 37:

Thus, in an exemplary embodiment shown in FIG. 3, evaluating a Siegel condition can be implemented very rapidly using only a comparator and two adders. The ability to quickly evaluate the Siegel conditions allows some embodiments of the invention to easily incorporate re-evaluations of Siegel conditions after performing a basis update process into the Householder CORDIC architecture. In an exemplary embodiment, implementing a basis update process 120 comprises performing a basis update process and evaluating at least the first and third Siegel conditions, if the second Siegel condition is not satisfied.

It can be noted that after a basis update for k=k', the state of the Siegel condition becomes uncertain for max(2,k'−1)≤k≤min(k'+1, $N_t$). This observation can be utilized in a collection of state machines, one for each Siegel condition, that track whether each Siegel condition is satisfied. Each of the state machines can indicate either "satisfied" or "uncertain" for each Siegel condition. In an exemplary embodiment, a single state machine tracks at least whether the first Siegel condition is satisfied, whether the second Siegel condition is satisfied, and whether the third Siegel condition is satisfied. In some embodiments, the LR method terminates when the state machine indicates that at least the first, second, and third Siegel conditions are satisfied. In anther exemplary embodiment, a first state machine tracks whether at least the first Siegel condition is satisfied, a second state machine tracks whether at least the second Siegel condition is satisfied, and a third state machine tracks whether at least the third Siegel condition is satisfied. In another exemplary embodiment, the LR method terminates when at least the first, second, and third state machines, indicate that at least the first, second, and third Siegel conditions are satisfied. In some embodiments, when all Siegel conditions in the upper triangular matrix are satisfied, the symbol vector estimate is unaffected by further size reduction operations.

FIG. 3 illustrates an exemplary embodiment of the present invention comprising a secondary datapath for evaluating the Siegel condition. The secondary datapath can also interface to an external data bus such that Siegel conditions can be evaluated as the R̃ matrix memory is being filled. The secondary datapath can also operate independently from the multilier in the Householder CORDIC architecture, which is used for both Householder CORDIC gain compensation (multiplication of C(‖v‖+ε) by 1/C) and partial computation of basis updates.

In an exemplary embodiment of the present invention, a LR method 100 for a MIMO communication system comprises providing a channel matrix corresponding to a channel in a MIMO communication system 105. The MIMO system can have any number of $N_t$ inputs and any number of $N_r$ outputs. In an exemplary embodiment, the MIMO system has four inputs and four outputs. The LR method 100 can further comprise preprocessing the channel matrix to form at least an upper triangular matrix 110. The upper triangular matrix can be a $N_t \times N_r$ upper triangular matrix. In another exemplary embodiment, preprocessing the channel matrix to form at least an upper triangular matrix 110 can be preprocessing the channel matrix to form a unitary matrix, an upper triangular matrix, and a unimodular matrix. In another embodiment of the present invention, the preprocessing the channel matrix 110 can be done by QR-decomposition In another embodiment, the lattice reduction method 100 can comprise implementing a size reduction process on elements of the upper triangular matrix 115. In yet another embodiment, the implementing a size reduction process on elements of the upper triangular matrix 115 can be implementing a relaxed size reduction process on elements of the upper triangular matrix. In some embodiments, the relaxed size reduction process can comprise choosing a first relaxed size reduction parameter for a first-off-diagonal element of the upper triangular matrix. The first relaxed size reduction can be equal for all elements of the first off diagonal of the upper triangular matrix.

In another embodiment of the present invention, the relaxed size reduction process can comprise choosing a second relaxed size reduction parameter for a second-off-diagonal element of the upper triangular matrix. In an exemplary embodiment the value of the second relaxed size reduction parameter is greater than the value of the first relaxed size reduction parameter. In another exemplary embodiment of the present invention, the relaxed size reduction parameter, $\phi_{n,k}$ is equal to 3/2 for all off diagonal elements except those on the first-off-diagonal. In some embodiments, when $\phi_{n,k}$ is equal to 3/2 for all off diagonal elements except those on the first-off-diagonal, size reduction on the elements where $\phi_{n,k}$ is equal to 3/2 occurs approximately 6.6% of all $1 \leq n \leq k-2$ inner loop iterations (Lines 4-7 of Table 1). In some other embodiments, the maximum encountered $\Re[u]$, $\Im[u]$ is ten.

In some embodiments, by choosing a first relaxed size reduction parameter $\phi_{k-1,k}$ equal to 0.51 and assuming G=15, which results in B being upper bounded by 7.31, an integer rounded divider is designed such that $M_{\gamma,a}$<0.001. In some embodiments, by representing u with 11 bits and allowing a LR method iteration to be repeated when any u component magnitude exceeds ten, size reduction operations for $\Re[u]$, $\Im[u]$>10 can be handled efficiently. In some embodiments, choosing $\phi_{k-1,k}$ equal to 0.51 results in 9.6% of all inner-loop iterations producing a u that has non-zero real and imaginary parts.

In some embodiments of the present invention, an NR-based reciprocation datapath only requires three (unsigned) integer bits. In an exemplary embodiment, the dividends in Line 4 of Table 1 are the components of the $\tilde{R}'_{k,k}$ elements, defined previously, and Equation 25 reveals that all dividend magnitudes are bounded above by $2^{6.60}$ (eight dividend integer bits). In some embodiments, after implementing a relaxed size reduction process with a particular k outer-loop iteration, the magnitude of each off-diagonal element in the k-th column is upper bounded by $$\frac{B}{\sqrt{2}}.$$

In some embodiments, no more than five integer bits are used at the beginning of the size reduction process to represent each real and imaginary component of $\tilde{R}$. In some embodiment, the magnitude of v in Equation 33 is upper bounded by B and the right hand side of Equation 34 is upper bounded by CB.

In some embodiments, an orthogonality deficiency threshold $\epsilon_{th}$ parameter is used to affect how often the step of preprocessing the channel matrix 110 must be completed on the channel matrices to maintain a desired BER performance. In some embodiments, the orthogonoality threshold $\epsilon_{th}$ is equal to 0.955. In some embodiments, when $\epsilon_{th}$=0.955, 40% of the channel matrices can be processed with at LR method or system to achieve 0.2 dB gap to ideal CLLL-MMSE-SIC detection.

In some embodiments of the present invention, when choosing design parameter values that affect computation precision of the hardware implementation, no loss of precision occurs while implementing a size reduction process 115 because there is no expansion in the number of fraction bits. In some embodiments, an expansion of fraction bits occurs when a basis update occurs, which can involve computation of a 2×2 unitary matrix, which can be denoted by Θ, and application of this matrix on an upper triangular matrix, which can be denoted by $\tilde{R}$, and a second unitary matrix, which can be denoted by $\tilde{Q}$. If $\epsilon_{th}$=0.955, a desired BER performance can be maintained with 13 fraction bits to represent the $\tilde{R}$ and $\tilde{Q}$ matrices, nine Householder CORDIC iterations, and up to 15 lattice reduction iterations. In some embodiments, the integer-rounded divider LUT requirements can be based on the $\tilde{R}$ fraction bit choice. In some embodiments γ=5 and a=6 when $M_{\gamma,a}$<0.001.

Developing a suitable top-level architecture for the LR systems and methods can be complicated by the fact that the dataflow of the systems and methods can be dynamic—each random channel matrix can result in a different sequence of memory accesses and operations. Careful inspection of the systems and methods, however, indicates that that operations on T and g, in some embodiments, only depend on the generated u values from size reduction operations and operations on $\tilde{Q}$ only depend on the Θ's generated from basis updates. Therefore, some embodiments of the present invention relate to a LR system comprising a master processor, a first slave processor, and a second slave processor. The master processor can be in indirect communication with the first slave processor by way of at least a first first-in first-out (FIFO) queue. The master processer can be configured to transmit a complex-integer output, which can be denoted by u, to the first FIFO queue. The first slave processor can be configured to receive the complex integer output from the first FIFO queue and process a unimodular matrix, which can be denoted by T. The master processor can also be in indirect communication with the second slave processor by way of at least a second FIFO queue. The master processor can be configured to transmit a 2×2 unitary matrix output to the second FIFO queue. The second slave processor can be configured to receive the 2×2 unitary matrix from the second FIFO queue and process a second unitary matrix, which can be denoted by $\tilde{Q}$. In some embodiments of the present invention, the first and second FIFO queues track the LR system state separately.

In some embodiments of the present invention, separate multiplier pipeline structures exist for the each processor. In other embodiments, the master processor, first slave processor, and second slave processor share a multiplier pipeline structure. Because the generated complex-integer output values can be sparse when the relaxed size reduction condition is used and only a fraction of all LR iterations require a basis update process to be performed, it is advantageous toward high multiplier utilization to choose a shared multiplier/accumulator structure with arbitration. In some embodiments, a multiplier pipeline that implements complex multiplication via separate real and imaginary component multiplication can be used to exploit the low frequency of fully complex-integer output values.

Figure 4:
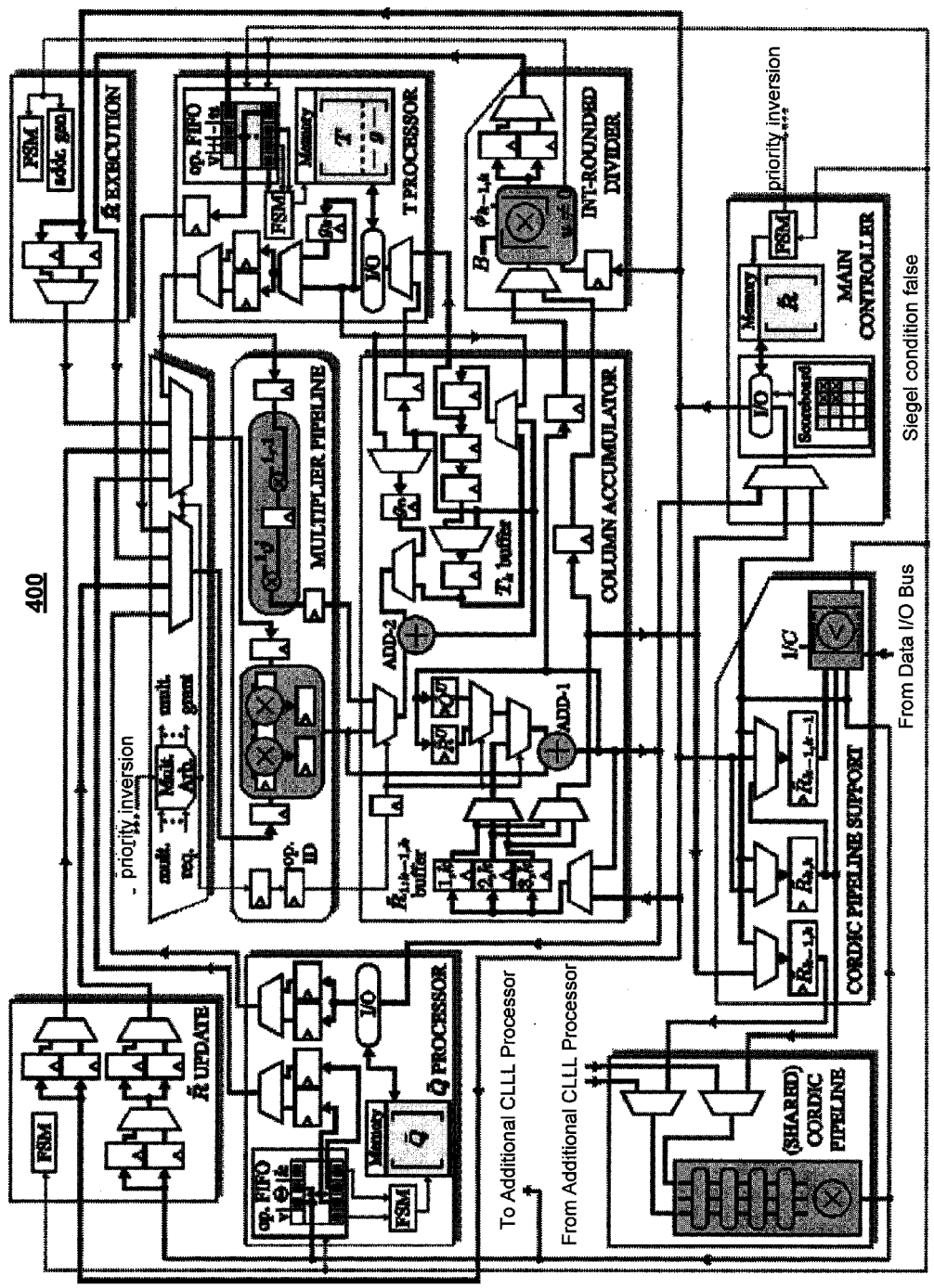
FIG. 4 provides a block diagram of an exemplary embodiment of a lattice reduction system.

FIG. 4 provides a block diagram of an exemplary embodiment of a lattice reduction system 400. The master processor can comprise the shared multiplier pipeline, column accumulator, and all remaining modules in the diagram except the first slave processor, labeled as "T Processor," and the second slave processor, labeled as "Q Processor."

Some embodiments of the LR systems 400 and methods 100 operate heavily on a single column each iteration while implementing a size reduction process 115. Therefore, in some embodiments, the master processor is based around a partial column buffer that stores the $\tilde{R}_{1:k-1,k}$ intermediate size reduction results. This choice is advantageous because, in some embodiments, the $\tilde{R}$ elements magnitude upper bound while implementing a size reduction process 115 can be greater than the $\tilde{R}$ elements magnitude upper bound at both the start and end of the size reduction process. Therefore, in the partial column buffer architecture, the $\tilde{R}$ memory need only be sufficiently wide to represent $\tilde{R}$ at the start of the size reduction process.

In some embodiments, the master processor can be additionally based around a single-port, single complex entry memory for storing $\tilde{R}$. Address mapping can be employed for column swapping. The datapath modules can include the shared multiplier pipeline structure, an integer-rounded divider, and a Householder CORDIC architecture that has been partitioned into a CORDIC pipeline support (secondary datapath) and a CORDIC pipeline. Parallel operation among these modules can be enabled through a combination of forwarding paths, speculative execution, and reordering of the original CLLL algorithm.

In some embodiments, at the beginning of each LR iteration, a main controller can direct the $\tilde{R}_{1:k-1,k}$ buffer in the column accumulator to be loaded from the $\tilde{R}$ memory. Alternatively, the main controller can direct the current contents of the buffer from the previous LR iteration to be reused if k≠2 and a basis update was performed during the previous iteration.

In some embodiments, at the beginning of each LR iteration, a main controller can direct the $\tilde{R}_{k-1,k}$ element to be sent to the CORDIC pipeline support from either the $\tilde{R}$ memory or a forwarding path. The integer-rounded divider can receive this element and begin reciprocation, or it can reuse a stored reciprocal.

In some embodiments, at the beginning of each LR iteration, a main controller can direct the $\tilde{R}_{k,k}$ element to be sent to the CORDIC pipeline support from either the $\tilde{R}$ memory or a forwarding path. This module can then begin evaluating the Siegel condition according to Equation 37.

In some embodiments, during the step of implementing a size reduction process 115, the $\tilde{R}_{k-1,k}$ element can be forwarded from the $\tilde{R}_{1:k-1,k}$ buffer to the dividend input of the introduced divider, and the relaxed size reduction condition evaluation can be initiated in this module. The real and imaginary components can require one cycle for this evaluation operation. The results of the evaluation can be written into a small table that an $\tilde{R}$ execution accesses. When this table indicates that a nonzero u has been generated, the $\tilde{R}$ execution can begin fetching the required $\tilde{R}$ column from the $\tilde{R}$ memory and simultaneously issuing single u component multiplications to the multiplier pipeline, starting with the (k−1)-th row. The multiplier results can then be sequentially added via an add-1 adder to their corresponding elements in the $\tilde{R}_{1:k-1,k}$ buffer as they exit the multiplier pipeline, and the buffer can be updated with these new values. As the updated $\tilde{R}_{k-1,k}$ element is written to the buffer, it can be simultaneously forwarded to the integer-rounded divider. Because the integer-rounded divider can already contain the diagonal element and reciprocal (stored in caches), size reduction on the next $\tilde{R}$ element can then begin as the remaining elements complete. This process can continue until size reduction on the k-th column is complete. The gradual write-back of the $\tilde{R}_{1:k-1,k}$ buffer elements to the $\tilde{R}$ memory can be overlapped with this operation.

In some embodiments, operation of the CORDIC pipeline support and the CORDIC pipeline is concurrent to implementing a size reduction process 115. If the CORDIC pipeline support indicates that a Siegel condition is true, then the main controller can be signaled that k can be incremented. The next iteration can be initiated once the size reduction process is complete, or the lattice reduction method can be terminated if all Siegel conditions are now satisfied. If the Siegel condition is not satisfied, then the CORDIC pipeline can wait until either the size-reduced $\tilde{R}_{k-1,k}$ element is forwarded or the integer-rounded divider indicates that size reduction on this element is not required. The Θ (Line 10 of Table 1) calculation can then begin because the necessary operands have already been speculatively loaded at the start of the iteration. Once the specified number of CORDIC iterations have been completed, the uncompensated C∥v∥ result from Equation 34 streams out of the CORDIC pipeline to the CORDIC pipeline support for gain compensation. This can be followed by three cycles of the Θ elements streaming out to the CORDIC pipeline support, the $\tilde{R}$ update, and the second slave processor ($\tilde{Q}$ processor). As these elements input into the CORDIC pipeline support, the elements can be appropriately signed and multiplied by the buffered $\tilde{R}_{k-1,k-1}$ element to form the updated elements of the (k−1)-th column (due to a basis update) in Line 11 of Table 1. These elements and the computed ∥v∥ can then be sent to the main controller for write-back. If there are remaining $\tilde{R}$ elements that must be updated, then the main controller can mark these elements as "pending" in the scoreboard structure, trigger the $\tilde{R}$ update to compute these remaining updates, decrement k, and effectively swap the $\tilde{R}$ by updating the address mapping register. Concurrent with this operation can be the reevaluation of affected Siegel conditions.

In some embodiments, as the main controller initiates the next iteration, the $\tilde{R}$ update can gradually fetch required elements from the $\tilde{R}$ memory and issue two multiplications to the multiplier pipeline when access is granted by the multiplier arbitration module. Therefore, each $\tilde{R}$ updated by a $\Theta$ multiplication can require three accesses to this module. The $\tilde{R}^U$ register and complex add-1 adder in the column accumulator can accumulate the partial $\Theta$ multiplication results from the multiplier pipeline. Upon the final accumulation for a particular element, the add-1 adder output can be written back to the $\tilde{R}$ memory and the corresponding scoreboard entry can be updated.

In some embodiments, the main controller comprises a memory arbiter. A memory arbiter can be advantageous because multiple modules can access the $\tilde{R}$ memory and basis updates on $\tilde{R}$ be overlapped with subsequent LR iterations. If no data dependency is present, then the highest priority can be assigned to memory reads associated with size reduction and the lowest priority can be assigned to memory read requests from the $\tilde{R}$ If, instead, the scoreboard indicates that a currently requested element is "pending," then the master processor can stall and the $\tilde{R}$ read requests can be promoted to the highest priority. The master processor can remain in this "priority inversion" state until the dependency is resolved.

In some embodiments, the first slave processor is based on the hardware structures in the master processor that handle the size reduction process. The first slave processor can issue operations to the multiplier pipeline to implement Lines 6-7 of Table 1. The first slave processor can contain a single-port memory to store an augmented matrix that comprises T concatenated with g (If MMSE processing is desired). The first FIFO queue can contain both non-zero complex integer u values and control flags that indicate the state of the master processor when a u was generated. These can include flags that indicate if the currently retrieved u was the last u generated for that lattice reduction iteration and if k was incremented or decremented during that iteration. These flags, when combined with internal address mapping for column swapping, independent tracking of k, and the separate single-port memory, can allow the first slave processor to operate independent of the master processor state. In addition, each entry in the first FIFO queue can contain flags that can indicate if the currently retrieved u has real or imaginary components equal to ±1. Hence, the first slave processor can issue single u component multiplications or utilize the trivial ±1 multiplication path in the multiplier pipeline. Results of these integer operations can be accumulated using an add-2 adder and a straightforward shift register ($T_k$ buffer) in the column accumulator.

In some embodiments, the second slave processor can be substantially similar to the $\tilde{R}$ except that the $\Theta$ parameters can be retrieved from a second FIFO queue. The second FIFO queue can also contain an entry for the value of k associated with the currently accessed $\Theta$. Because the second slave processor can also contain a separate, single-port memory for $\tilde{Q}$, it can complete $\tilde{Q}$ basis updates independently of the master processor state. Partial $\Theta$ multiplication results can be accumulated in the $\tilde{Q}^U$ register located in the column accumulator.

In some embodiments, to prevent the first FIFO queue or second FIFO queue entries from being overwritten before being processed, "nearly full" status flags can be included in the FIFO queues. For the first slave processor, this flag can be first asserted when the FIFO only has a sufficient number of empty entries to store the maximum number of possible non-zero complex-integer u values generated during a single LR iteration. For the second slave processor, this flag can be first asserted when the FIFO only has a sufficient number of empty entries to store one additional $\Theta$. Therefore, in some embodiments of the LR systems or methods, the master processor is configured to stall if the first FIFO queue or the second FIFO queue has a minimum number of empty entries. In an exemplary embodiment of the present invention, the first FIFO queue has a depth of 16. In another exemplary embodiment of the present invention, the second FIFO queue has a depth of nine.

In some embodiments of the present invention, arbitration can be used to handle contention for access to the shared multiplier pipeline among the various modules. In some embodiments, the first slave processor utilizes the multiplier pipeline structure when the master processor is not utilizing the multiplier pipeline structure. In some embodiments, the second slave processor utilizes the multiplier pipeline structure when the master processor and the first slave processor are not utilizing the multiplier pipeline structure. In some exemplary embodiments, the multiplier pipeline structure has a utilization rate exceeding 80%. In some embodiments, an arbitration scheme can be adopted such that the master processor can progress through lattice reduction iterations as quickly as possible. Therefore, in some embodiments, when no data dependency exists, a multiplier arbitration module can assign highest priority to the $\tilde{R}$ execution module followed by the first slave processor, the $\tilde{R}$ module, and the second slave processor. In some embodiments, when a data dependency exists ("priority inversion"), requests from the $\tilde{R}$ update module can be promoted to highest priority, and requests from the $\tilde{R}$ execution module can be demoted to lowest priority.

In some embodiments of the present invention, overlapped execution of the LR system can occur on multiple channel matrices among the three processors. This can be accomplished by employing two banks of memory in each processor. As a processor is operating on one memory bank, the other memory bank can be simultaneously filled with the next matrix/vector associated with the next channel matrix to process. Then, once the processor completes operations on the current memory bank, it can simultaneously output the current memory bank contents and immediately begin processing on the other memory bank (assuming the FIFO queues are not empty in the first slave and second slave processor case).

In an exemplary embodiment of the present invention, the LR systems and methods can be implemented in Verilog. In another exemplary embodiment, hardware realization can be completed using an FPGA flow comprising Synplify Pro for synthesis and Xilinx ISE 9.1 for place-and-route (PR). Tables 3 and 4 summarize hardware realization results for variety of FPGA targets.

TABLE 3

Comparison of Hardware Realization Results for a Variety of FPGA Targets

|  | A Conventional Realization of Clarkson's Algorithm | A Conventional Realization of Seysen's Algorithm | Exemplary Embodiments of Present Invention | | |
| --- | --- | --- | --- | --- | --- |
| Platform | XC2VP30-7 | 65 nm ASIC | XC2VP30-7 | XC2VLX110-3 | XC4VLX80-12 |
| Multipliers | 24 | 8 | 4 | 4 | 4 |
| Hardware Use | 7,349 slices | 67,000 gates | 3,640 slices | 1,758 slices | 3,571 slices |
| Clock (MHz) | 100 | 400 | 140 | 206 | 173 |
| cycles per matrix | 420 avg. | 1368 worst-case | 49 avg., 96 system avg., 447 worst-case | | |

TABLE 4

Distribution of Required Slices

| | |
| --- | --- |
| First Slave Processor | 8% |
| Integer-Rounded Divider | 14% |
| Master Processor | 15% |
| CORDIC Pipeline Support | 8% |
| CORDIC Pipeline | 27% |
| Multiplier Pipeline | 5% |
| Column Accumulator | 17% |
| Second Slave Processor | 6% |

Figure 5:
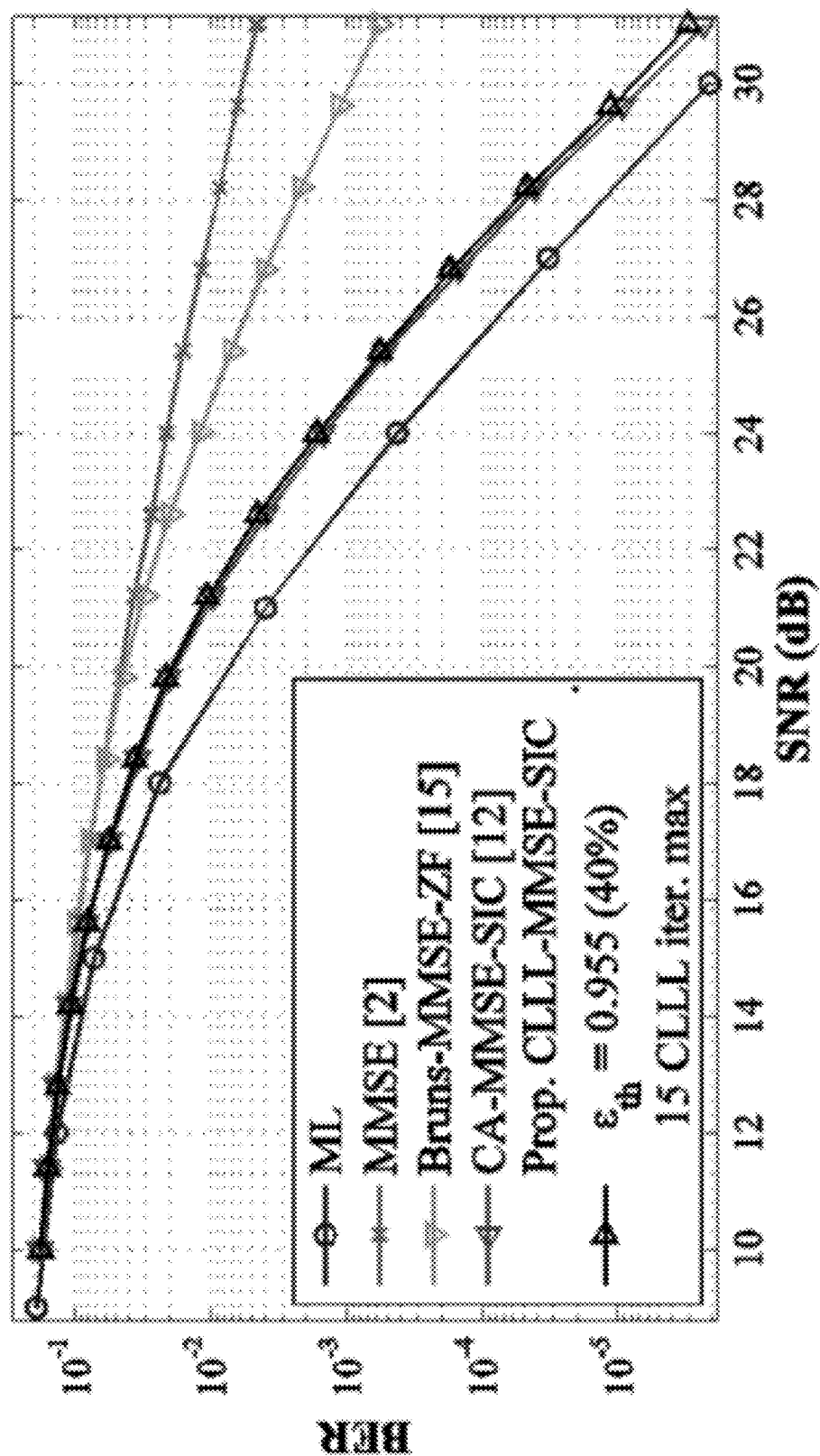
FIG. 5 provides BER results obtained by some embodiments of the present invention in comparison to conventional lattice reduction systems and methods

FIG. 5 provides BER results obtained by some embodiments of the present invention in comparison to conventional LR systems and methods. The BER performance of previously implemented algorithms in FIG. 5 was obtained from ideal algorithm models (unlimited iterations and floating-point precision). From FIG. 5, it is shown that by implementing the LR systems and methods of the present invention on only 40% of all channel matrices on average, a considerable BER performance improvement is achieved over the MMSE detection of some conventional systems. FIG. 5 also illustrates that some embodiments of the present invention achieve a 5 dB improvement in BER performance compared to some conventional systems that employ Brun's algorithm and are within 1.5 dB of optimal ML detection.

Some embodiments of the present invention have also been evaluated from a system perspective by simulating the packet structure of an 802.11n system in Mixed Mode. The OFDM symbol length in this case is 4 µs, and there are 52 sub-carriers. In the simulation, it was assumed the sorted QR-decomposition of the channel matrix for each sub-carrier is completed just at the corresponding symbol vector associated with that sub-carrier in the first OFDM symbol is received. The simulation measured the latency of the at the end of the first transmitted OFDM symbol, used the Virtex5 synthesis results, and set $\epsilon_{th}$=0.955. Simulations of this system configuration indicate that the probability of the latency exceeding 12.08 µs (3.02 OFDM symbols) is 0.5%, and the average latency is 5.7 µs. Hence, a LR processor with an OFDM symbol buffer is sufficient to handle medium to large size packets (10-100 OFDM symbols). To handle smaller packets, either additional LR processors can be adopted or the $\epsilon_{th}$ and ζ can be dynamically adjusted, which can reduce the complexity and latency. Adoption of this adaptive technique may require that the secondary datapath in FIG. 2 incorporate multiple Siegel condition approximations, which could be straightforwardly implemented using multiplexers on the inputs of the adders.

From Table 3, it is shown that current embodiments of the present invention achieve considerable improvement over conventional systems. The channel matrix processing latency is 2.17 µs in an exemplary embodiment of the present invention while 3.42 µs for the Seysen's algorithm implementation. The exemplary embodiment can achieve this 37% reduction in worst case latency with using about half the number of multipliers as the Seysen implementation.

Further, an exemplary embodiment of the present invention requires less than an eighth of the processing cycles compared to some conventional systems employing an Implementation of Clarkson's algorithm. The significant improvement over is achieved a number of ways. First, the conventional implementation of Clarkson's algorithm utilizes a shared division unit for both computing u values (via reciprocation multiplication) and computing Θ matrices. An exemplary embodiment instead utilizes a reduced-precision reciprocation unit in addition to a collection of comparators for detecting trivial u values. In addition, the reciprocals are sufficiently accurate for use in the subsequent SIC detection step. Second, an exemplary embodiment uses a relaxed the size reduction condition on the R̃ elements as opposed to eliminating size reduction operations, as done in the conventional implementation of Clarkson's algorithm. This allows the exemplary embodiment to upper bound the R̃ elements during the LR processing. The slight increase in the number of size reduction operations is more than compensated by the efficient utilization of the multiplier pipeline structure in the an exemplary embodiment, which can be over 80% for the system. Third, the 3-dimension Householder CORDIC algorithm employed in an exemplary embodiment requires only one sequence of vectoring iterations, while the 2-dimension rotation-based CORDIC unit in the conventional implementation of Clarkson's algorithm requires two sequences of vectoring iterations. The unrolling inherent in the exemplary embodiment's Householder CORDIC architecture, which supports the concurrent Θ computation, results in the CORDIC pipeline requiring the largest percentage of hardware resources (as shown in Table II). The critical path of the CORDIC pipeline, which limited by the achievable clock frequency in some conventional systems, is improved by over 20%, and this module can be easily shared among LR processors. Fourth, an exemplary embodiment modifies how a Siegel condition is computed in conventional systems. In an exemplary embodiment, a low complexity approximation is employed that results in a negligible degradation in BER performance. As a result, the exemplary embodiment is able to re-evaluate Siegel conditions rapidly without multiplication and use this information to terminate the LR system earlier.

It is to be understood that the embodiments and claims of this invention are not limited to wireless MIMO communication systems, but as those of ordinary skill in the art would understand, the systems and methods of the present invention may be used in a large majority of MIMO communication systems.

It is further to be understood that the embodiments and claims are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A lattice reduction method for a multiple-input multiple-output communication system, the method comprising:
   providing a channel matrix corresponding to a channel in a multiple-input multiple-output communication system;
   preprocessing the channel matrix to form at least an upper triangular matrix;
   implementing a relaxed size reduction process on elements of the upper triangular matrix, comprising:
      choosing a first relaxed size reduction parameter for a first-off-diagonal element of the upper triangular matrix;
      choosing a second relaxed size reduction parameter, which is greater than the first relaxed size reduction parameter, for a second-off-diagonal element of the upper triangular matrix;
      evaluating whether a first relaxed size reduction condition is satisfied for the first-off-diagonal element of the upper triangular matrix, the first relaxed size reduction condition based in part on the first relaxed size reduction parameter; and
      evaluating whether a second relaxed size reduction condition is satisfied for the second-off-diagonal element of the upper triangular matrix, the second relaxed size reduction condition based in part on the second relaxed size reduction parameter; and
   implementing a basis update process on diagonal elements of the upper triangular matrix.

2. The lattice reduction method according to claim 1, wherein implementing a relaxed size reduction process further comprises performing a relaxed size reduction process using an integer rounded divider based on a single Newton-Raphson iteration if the first or second relaxed size reduction condition is not satisfied.

3. The lattice reduction method according to claim 1, wherein implementing a relaxed size reduction process further comprises performing a relaxed size reduction process using only addition operations if the first or second relaxed size reduction condition is not satisfied.

4. The lattice reduction method according to claim 1, wherein implementing a relaxed size reduction process further comprises performing a relaxed size reduction process using only addition operations and an integer rounded divider based on a single Newton-Raphson iteration if the first or second relaxed size reduction condition is not satisfied.

5. A lattice reduction method for a multiple-input multiple-output communication system, the method comprising:
   providing a channel matrix corresponding to a channel in a multiple-input multiple-output communication system;
   preprocessing the channel matrix to form at least an upper triangular matrix;
   performing a size reduction process on elements of the upper triangular matrix; and
   implementing a rapid basis update process on diagonal elements in the upper triangular matrix, comprising:
      choosing an efficient Siegel condition factor; and
      evaluating whether a first Siegel condition is satisfied between a first pair of adjacent diagonal elements of the upper triangular matrix comprising a first diagonal element and a second diagonal element without using multiplication operations, the first Siegel condition based in part on the efficient Siegel condition factor.

6. The lattice reduction method according to claim 5, wherein the implementing a rapid basis update process further comprises evaluating whether a second Siegel condition is satisfied between a second pair of adjacent diagonal elements of the upper triangular matrix comprising the second diagonal element and a third diagonal element without using multiplication operations.

7. The lattice reduction method according to claim 6, wherein the implementing a rapid basis update process further comprises evaluating whether a third Siegel condition is satisfied between a third pair of adjacent diagonal elements of the upper triangular matrix comprising the third diagonal element and a fourth diagonal element without using multiplication operations.

8. The lattice reduction method according to claim 7, wherein the efficient Siegel condition factor is 2.06640625.

9. The lattice reduction method according to claim 7, wherein a state machine tracks at least whether the first Siegel condition is satisfied, whether the second Siegel condition is satisfied, and whether the third Siegel condition is satisfied, and the lattice reduction method further comprises terminating when the state machine indicates that the first, second, and third Siegel conditions are satisfied.

10. The lattice reduction method according to claim 7, wherein a first state machine tracks whether at least the first Siegel condition is satisfied, a second state machine tracks whether at least the second Siegel condition is satisfied, and a third state machine tracks whether at least the third Siegel condition is satisfied, and the lattice reduction method further comprises terminating when at least the first, second, and third state machines indicate that at least the first, second, and third Siegel conditions are satisfied.

11. The lattice reduction method according to claim 7, wherein the evaluating whether the first Siegel condition is satisfied, the evaluating whether the second Siegel condition is satisfied, and the evaluating whether the third Siegel condition is satisfied are performed using a comparator and two adders.

12. The lattice reduction method according to claim 7, wherein the evaluating whether the first Siegel condition is satisfied, evaluating whether the second Siegel condition is satisfied, and evaluating whether the third Siegel condition is satisfied each occur while memory of the upper triangular matrix is being filled.

13. The lattice reduction method according to claim 7, wherein implementing a rapid basis update process further comprises performing a basis update process and evaluating at least the first and third Siegel conditions, if the second Siegel condition is not satisfied.

14. A lattice reduction method for a multiple-input multiple-output communication system, the method comprising:
providing a channel matrix corresponding to a channel in a multiple-input multiple-output communication system;
preprocessing the channel matrix to form at least an upper triangular matrix;
performing a size reduction process on elements of the upper triangular matrix; and
implementing an iterative basis update process on elements in the upper triangular matrix, comprising computing a 2×2 unitary matrix using a number of vectoring iterations,
wherein the computing the 2×2 unitary matrix is completed in a number of cycles equal to a number of pipeline stages plus the number of vectoring iterations minus one.

15. The lattice reduction method according to claim 14, wherein the computing a 2×2 unitary matrix using a number of vectoring iterations employs a single iteration per cycle Householder CORDIC architecture that has been unrolled and includes the number of pipeline stages configured to concurrently execute at least one vectoring iteration and at least one rotation iteration.

16. The lattice reduction method according to claim 15, wherein each of the number of pipeline stages operates in a vectoring mode or a rotation mode.

17. The lattice reduction method according to claim 15, wherein each of the number of pipeline stages comprises at least one multiplexer with an input and a plurality of outputs equivalent to the number of vectoring iterations divided by the number of pipeline stages.

18. A lattice reduction system, comprising:
a master processor configured to transmit a complex-integer output to a first First-In First-Out ("FIFO") queue and a 2×2 unitary matrix output to a second FIFO queue;
a first slave processor in indirect communication with the master processor by way of at least the first FIFO queue and configured to receive the complex-integer output from the first FIFO queue and process a unimodular matrix; and
a second slave processor in indirect communication with the master processor by way of at least the second FIFO queue and configured to receive the 2×2 unitary matrix output from the second FIFO queue and process a second unitary matrix,
wherein the master processor, the first slave processor, and the second slave processor utilize a single multiplier pipeline structure.

19. The lattice reduction system according to claim 18, wherein the master processor, the first slave processor, and the second slave processor each comprises two memory banks configured so that multiple channel matrices may be processed concurrently.

20. The lattice reduction system according to claim 18, configured so that the multiplier pipeline structure has a utilization rate greater than 80%.

21. The lattice reduction system according to claim 18, wherein the master processor is configured to stall if the first FIFO queue or the second FIFO queue has a minimum number of empty entries.

22. The lattice reduction system according to claim 18, wherein the first slave processor utilizes the multiplier pipeline structure when the master processor is not utilizing the multiplier pipeline structure.

23. The lattice reduction system according to claim 18, wherein the second slave processor utilizes the multiplier pipeline structure when the master processor and the first slave processor are not using the multiplier pipeline structure.

* * * * *